United States Patent
Hakki et al.

(12) 
(10) Patent No.: US 10,723,351 B1
(45) Date of Patent: Jul. 28, 2020

(54) COLLISION PREVENTION SYSTEM

(71) Applicant: Physician Electronic Networks, L.L.C., Dunedin, FL (US)

(72) Inventors: A-Hamid Hakki, Dunedin, FL (US); Maryam Hakki, Dunedin, FL (US); Dina A. Hakki, Dunedin, FL (US); Belmina Hakki, Dunedin, FL (US); Nadia Hana Hakki, Dunedin, FL (US)

(73) Assignee: Physician Electronic Networks, L.L.C., Dunedin, FL (US)

( * ) Notice: Subject to any disclaimer, the term of this patent is extended or adjusted under 35 U.S.C. 154(b) by 0 days.

(21) Appl. No.: 16/825,297

(22) Filed: Mar. 20, 2020

Related U.S. Application Data

(63) Continuation-in-part of application No. 16/506,439, filed on Jul. 9, 2019, now Pat. No. 10,632,914, which is a continuation-in-part of application No. 15/721,752, filed on Sep. 30, 2017, now Pat. No. 10,392,013.

(51) Int. Cl.
*B60W 30/09* (2012.01)

(52) U.S. Cl.
CPC ............................. *B60W 30/09* (2013.01)

(58) Field of Classification Search
CPC ............................. B60W 10/00; B60W 1/00
See application file for complete search history.

(56) References Cited

U.S. PATENT DOCUMENTS

| | | | |
|---|---|---|---|
| 3,750,529 A * | 8/1973 | Reed | F41F 3/0455 89/1.8 |
| 5,510,793 A | 4/1996 | Gregg, III | |
| 5,948,035 A | 9/1999 | Tomita | |
| 6,701,234 B1 | 3/2004 | Vogelsang | |
| 6,733,134 B2 | 5/2004 | Bleiner | |
| 7,049,978 B2 | 5/2006 | Li | |
| 7,375,621 B1 | 5/2008 | Hines | |
| 9,221,392 B2 | 12/2015 | Chen | |
| 9,221,509 B2 | 12/2015 | Lai | |
| 9,799,223 B2 | 10/2017 | Nespolo | |
| 10,281,916 B1 * | 5/2019 | Cui | G05D 1/0246 |
| 10,392,013 B2 | 8/2019 | Hakki et al. | |
| 2005/0259033 A1 | 11/2005 | Levine | |
| 2007/0125289 A1 * | 6/2007 | Asfar | B63G 8/001 114/312 |

(Continued)

*Primary Examiner* — Shirley Lu
(74) *Attorney, Agent, or Firm* — Larson & Larson, P.A.; Frank Liebenow; Justin P. Miller

(57) ABSTRACT

A vehicle safety system includes one or more sensors interfaced to an index vehicle and a computer that is operatively interfaced to the one or more sensors, thereby the computer obtains sensor data from the one or more sensors. One or more propulsion devices are operatively coupled to the computer such that the computer controls activation of each propulsion device. The computer executes software that causes the computer to iteratively calculate a size of a safety zone based upon the sensor data and to iteratively determine if an object enters the safety zone as well as if a collision with the object is imminent. If it is determined that the collision with the object is imminent, the software causes the computer to signal one or more of the propulsion devices to emit a jet of liquid, thereby decelerating and/or changing direction of the index vehicle and/or of the object.

14 Claims, 21 Drawing Sheets

(56) References Cited

U.S. PATENT DOCUMENTS

| | | |
|---|---|---|
| 2007/0159311 A1 | 7/2007 | Schober |
| 2008/0033648 A1* | 2/2008 | Kelly .................. G05D 1/10 |
| | | 701/301 |
| 2008/0219014 A1 | 9/2008 | Loibi |
| 2009/0210117 A1 | 8/2009 | Oowada |
| 2010/0253493 A1 | 10/2010 | Szczerba |
| 2010/0283590 A1 | 11/2010 | Tee et al. |
| 2010/0290774 A1 | 11/2010 | Matsuoka |
| 2012/0112635 A1 | 5/2012 | Cho |
| 2014/0095061 A1 | 4/2014 | Hyde |
| 2014/0267415 A1 | 9/2014 | Tang |
| 2015/0166072 A1 | 6/2015 | Powers |
| 2015/0203023 A1 | 7/2015 | Marti |
| 2016/0096486 A1 | 4/2016 | Dziurda |
| 2017/0101147 A1 | 4/2017 | Hasegawa |
| 2017/0113604 A1 | 4/2017 | Asaoka |
| 2018/0072220 A1 | 3/2018 | Yan |
| 2019/0329708 A1 | 10/2019 | Hakki |
| 2019/0335035 A1 | 10/2019 | Borras |

* cited by examiner

COLLISION PREVENTION SYSTEM

CROSS-REFERENCE TO RELATED APPLICATION

This application is a continuation in part of U.S. patent application Ser. No. 16/506,439, filed Jul. 9, 2019 which is a continuation in part of U.S. patent application Ser. No. 15/721,752, filed Sep. 30, 2017, the disclosure of both are hereby incorporated by reference.

FIELD

This invention relates to the field of motor vehicles and more particularly to a system for preventing collisions.

BACKGROUND

Today, vehicles such as cars, boats, and aircrafts move at speeds that expose their occupants to the risk of body injury and death in the event of a collision. Car accidents are a major cause of morbidity and mortality. Annually, about 3 million people are injured, many are permanently disabled and many die as a result of their injuries. Seatbelts and inflatable safety devices (air bags) have undoubtedly saved innumerable lives. However, one issue with airbags and seatbelts is that they are deployed after a collision and not before.

Measures to prevent collisions are far more valuable in saving lives than measures deployed after a crash. Sensors have been utilized to prevent accidents such as using ultrasound, video cameras, lasers and radar. However, signals/alarms emanating from monitoring these sensors are available only to the driver of the vehicle into which they are integrated, and not to drivers of other vehicles. In addition, once a collision has occurred, there is currently no reliable method to immediately discover, quantify and report the accident.

Fender benders are the most common type of motor vehicle accidents. Two million or more occur each year, in parking lots, when backing up into oncoming traffic, or when stopping suddenly. Although rarely a cause of serious injuries, fender benders often result in costly repairs and increased in insurance rates. In order to prevent Fender Benders, a variety of technologic advances have been deployed. Recently, forward-collision detection and lane-departure electronic signals warn the driver of the vehicle to take corrective action, usually by a visual and/or audible warning whenever a car strays from its lane or gets too close to the car ahead. Color coding of the closeness to the car ahead helps to alert the driver as to the distance ahead, green, yellow and red. These warnings are often muted at low speeds, such as less than 15 miles per hour. Forward-collision detection and lane-departure detection systems typically rely on radar, ultrasound, or camera imaging.

Tailgating is responsible for more than one third of all motor vehicle accidents. Tailgating is defined as a vehicle encroaching on the safe space between that vehicle and a leading vehicle (the car ahead of you). When tailgating occurs, it is often impossible to stop your vehicle in the event that the leading vehicle decelerates suddenly, resulting in a collision. This "safe" distance varies with several factors such as vehicle specification and make, speed of vehicle, road conditions, darkness (ambient light), and weather conditions. Current sensors are available to estimate this "safe" distance, but the information is only available to the driver of the vehicle on which those sensors are integrated. Safety tips such as maintaining a distance between your vehicle and the leading vehicle (e.g. car ahead of you) often suggest keeping 10 feet of distance for every 10 mile per hour of speed. For instance, 60 feet is deemed a safe distance for speeds of 60 mph. This distance increases during inclement weather. There is also a two second rule between the vehicle and the leading vehicle as each passes a stationary object (e.g. a light post or a road sign). This relies on the driver accurately measuring two seconds between when the leading vehicle passes the stationary object and when the driver's vehicle passes the stationary object. The two second rule applies to dry road conditions, as four seconds is recommended for wet roads, and ten seconds for snow or ice-covered roads. Tailgating is not only illegal but also causes serious and fatal accidents. In addition, tailgating is rarely documented.

Drivers of vehicles backing up in a parking lot may have difficulty seeing pedestrians or other vehicles in the line of travel. Similarly, drivers parking (looking for a parking space) and pedestrians may have difficulty seeing cars that are backing out of parking spaces.

Many vehicular accidents are avoidable. Often, a driver of a first vehicle (index vehicle) is following too close behind a second vehicle and, when the second vehicle slows down or stops, the driver of the first vehicle (index vehicle) has insufficient time to stop, thereby resulting in a collision.

Drivers are human, and each driver constantly makes driving decisions based upon speed, road conditions, traffic, etc. It is often recommended that one maintain at least one car length per ten miles per hour, but it is often difficult to determine five or six car lengths, as this is an imaginary distance and based on a fictional car size as imagined by the driver. Other than vehicle velocity, stopping distance is impacted by the road surface, road conditions (e.g. wet, snow, ice), tire conditions, vehicle load, tire condition, tire pressure, brake shoe wear, etc. These factors also apply to self-driving vehicles.

To this, it is difficult for a driver to know what a safe following distance might be given such diverse condition. Yet, driving at a safe distance from other vehicles is critical to avoiding accidents.

There have been some limited attempts to provide a system that projects an image onto the roadway for helping with distance control between vehicles. For example, U.S. Pat. No. 9,221,509 to Lai for a Display Apparatus and Vehicle Having Projector Device has a display projection system for a vehicle that presents data on a roadway surface in front of the vehicle. The shape, size, and/or location of the projected image are not dynamic and does not change based upon factors that are critical to preventing a collision such as vehicle speed, road conditions, steering wheel rotation, etc., and therefore cannot be relied upon to reliably prevent collisions U.S. Pat. Publication 2008/0219014 to Loibi for a Bicycle Bumper with a Light Generating a Bike Lane has a light emitter on a bicycle that emits a pattern indicating to other bikers an unsafe passing area. Again, this is a static pattern that does not change based upon bicycle speed, road conditions, steering direction, etc.

Sometimes, when a collision does occur, one or more occupants of the vehicle(s) involved require medical attention, but medical help is often miles away. As trauma is often involved, the length of time between when the collision occurred and when emergency personnel arrive is critical and even seconds will determine whether some people will live or die. Therefore, in such situations, immediate alerting of emergency responders (e.g. police, fire, ambulance, EMT) is of utmost importance.

Speed of travel is a necessity of daily life that continues to lead to innovations in means of transportation. Faster and safer vehicles come with the drawback of mechanical and electronic failure that leads to accidents, with significant negative impact on physical and psychological health, disability and loss of life. Economic losses are astronomical. Seat belts and inflatable safety devices (interior air bags) have undoubtedly saved many lives since their widespread use, but many have caused some injuries and even death. A collision is defined as the meeting of objects in which each exerts a force upon the other, causing the exchange of energy or momentum. The objects may be stationary or mobile. Most vehicles are equipped with devices that are designed to slow and stop the vehicle before impacting other objects.

External means of deceleration before impact such as exterior airbags exist but failed to gain momentum due to inherent limitations such as the short distance required before effective deployment or impact, extreme bulk and storage space required for safe deceleration and vehicle disability after any deployment.

A conventional (interior) air bag system used for motor vehicles generally includes an inflatable folded air bag, a collision sensor that senses the collision of the vehicle and generates a collision-sensing signal. An electronic control unit receives the collision signal and controls the operation of the airbag by signaling the inflator to inject gas or air into the folded air bag. The air bag is then deployed and inflates against the occupants of the vehicle. The collision sensor is mounted to the forefront of the vehicle. Upon collision of the vehicle with another vehicle or object, the collision sensor will receive the shock of the impact, and generates a collision sensing signal and supplies it to the electronic control unit, and if this exceeds a certain preset value, the electronic control unit will provide the inflator with the air bag expansion triggering signal. The explosive combustion of a pyrotechnic or other substance and a gas generating material being an ignitable material included in the inflator will instantaneously supply the folded air bag and result in sudden full inflation. The inflator includes a cylindrical container with a chamber containing a squib, a pyrotechnic material, and a gas generating material being an ignitable substance.

An externally mounted air bag arrangement is illustrated in U.S. Pat. No. 5,725,265 to Baber. The air bag is housed in a bumper-like chamber that is activated automatically after impact and relies upon the cushioning effect of the inflated air bag.

U.S. Pat. No. 5,431,463 to Chou describes a shock absorber such as rubber cell with a compression spring that deflates upon impact and acts as a cushion.

U.S. Pat. No. 6,056,336 to Balgobin describes an air bag with internal shock absorber. The air bag is mounted on the front or rear of the vehicle. The external air bag assembly is located in a cavity in the bumper of the vehicle and includes a deployable shock-absorbing bumper assembly within the air bag that expands forward and provides additional shock absorbing region. The system is activated manually by the occupants of the vehicle using an actuated switch mounted on the dashboard of the vehicle. U.S. Pat. No. 6,056,336 also proposes an alternative automatic switch for activation.

Other patens propose external air bags that are triggered before impact by a variety of sensors such as radar or sonar. For example, U.S. Pat. No. 6,450,556 to Tony J. Jacobs teaches an exterior air bag system that provides under-ride protection by an exteriorly mounted sensor that upon impact triggers the deployment of the air bag. The air bag is located on the bottom side of a truck and substantially laterally inwardly from a lateral side periphery. U.S. Pat. No. 3,822,076 to Mercier and LeFeuvre has an energy absorbing buffer device for motor vehicles and a mechanical and hydraulic obstacle detector.

U.S. Pat. No. 6,106,038 to Peter A. Dreher has an external air bag system for collision damage reduction triggered by sensors prior to impact. The system reduces contact velocities between a vehicle and an object by use of air bags on the exterior of the vehicle. In an analysis of the physics of the exterior air bags, Newton's Second Law of Motion (Force=Mass×Acceleration) is applied to calculate an area of the bag contact on the front of the vehicle times the bag pressure equals the force on the vehicle. The force on the vehicle divided by its mass equals its deceleration or rate of reduction of velocity per unit time. Therefore, as the bag compresses, the vehicle decelerates, taking longer to compress each subsequent length of the air bag. Thus, the velocity of the vehicle drops exponentially with length of air bag compression. This reference also notes that with air bag compression, the gas pressure inside the bag rises inversely proportional to the remaining space in the bag in an exponential manner. In other words, an un-vented air bag slows a vehicle at a fast and exponential rate. This reference notes a problem of severe rates of deceleration and its effect on the compression of vital organs of the occupants of the vehicle, such as the brain, which may result in injury and death. It is known that rate of deceleration exceeding 18 g's is not tolerated by humans. This reference presents a mathematical model using an exterior air bag measuring 5 feet in length and 4 feet in width and 2.5 feet high, starting at in initial inflation pressure of 15 psig to handle 3,000 pounds motor vehicle with passengers colliding with an immovable object. A silicone rubber coated fabric with no holes is used in order to hold the initial bag pressure and includes two pressure relief valves to expel gas when the compression is under way. As long as the bag pressure stays below 62 psig on a 3,000 lb. motor vehicle with 6 square feet of frontal area, the car deceleration stays under 18 g's. Weakly sewn pieces of fabric (0.4 and 0.3 square foot patch) will act as relief valves at pressures of 30 and 40 psig. Note that with the disclosed design, it may take 200 milliseconds to fully inflate the airbag for an average vehicle.

U.S. Pat. No. 6,209,909 to David S. Breed includes a method to distance the passenger from the side door during side impact. An internal air bag is activated prior to collision by using pattern recognition of radiant energy from the impacting object or vehicle. By using two inflators with variable inflation rates that inflated 2 air bags independently of each other, by way of 2 independent crash sensors. The air bags inflate between the vehicle occupant and the side door. Also disclosed is using an external air bag stored within the side door to be deployed prior to impact to cushion of the impact. Not addressed is pattern recognition techniques and methods to assess the probable severity of a pending impact utilizing ultrasound, electromagnetic waves system, and infrared electromagnetic waves as well as pedestrian protection.

In U.S. Pat. No. 6,749,218 to Breed, more details of an externally deployed air bags system are shown. This includes side air bags as well as air bags in the front as well as the rear of the vehicle and provisions to cushion a pedestrian struck by a vehicle.

In U.S. Pat. No. 6,772,057 to Breed et al, systems for vehicular monitoring using image processing are described including a monitoring system for the environment interior and exterior to the vehicle and using the information thus obtained to control the inflation of air bags and other systems in the vehicle. Pattern recognition system is used to enable controlled inflation of the air bags prior and during collision. Also disclosed is a monitoring system to assess passenger position during impact and methods to minimize collision damage as well as cameras surrounding the vehicle in order to view the interior as well as the exterior of the vehicle.

U.S. Pat. No. 6,416,093 to Phillip Schneider describes an energy absorption, rotation and redirection system for use with a vehicle astride a barrier. An external air bag system is described that does not cover the entire surface of the vehicle, and specifically addresses bumper and side air bags for protection against road barriers. In addition, the invention teaches not to attempt to substantially absorb the force of the impact with the surrounding barrier, but rather to only absorb a minimal portion of the impact, while converting the majority of the force of the impact into a rotating and redirecting force thereby dissipating the energy by use of a circular motion. A plurality of airbags along the front and sides of the vehicle, each constructed of a heavy-duty nylon material with concentric inner and outer layers, to take into account the chance of puncture of the outer layer before the airbag is fully deployed.

U.S. Pat. No. 6,408,237 to Daniel M Cho describes at least one interior and at least one exterior air bag system for the protection of vehicles, roadside objects and pedestrians. Such includes an intricate system that relies on an external and an internal detection system as well as wireless technology to predict collision and to minimize damage to people and property.

U.S. Pat. Nos. 5,959,552 and 5,646,613 to Myungeun Cho teaches the use of exterior air bags located to the front, sides and back of vehicles.

U.S. Pat. No. 6,543,803 to Shawn G. Ryan describes pedestrian protection using a scuttle area air bag. The exterior air bag inflates along the lower windshield as well as part of the vehicle below the windshield of the vehicle, without obstructing the view of the operator.

U.S. Pat. No. 6,474,679 to Miyasaka et al describes a vehicle air bag system that inflates and unfolds to cover the entire front surface of a front pillar to protect a pedestrian during a collision.

U.S. Pat. No. 6,467,563 to Ryan et al describes a windshield frame air bag for pedestrian protection. When deployed the airbag substantially covers the windshield and adjacent pillars and provides for view ports to maintain a degree of visibility.

U.S. Pat. No. 6,227,325 to Reza H. Shah has an external safety bag for a variety of conveyances. For automobiles, the air bag system provides for deceleration and flotation in case of crashes into water. The size of the air bag is almost equal to the size of the automobile, and each bag has two compartments, front and rear. The front of the air bag forms an effective resistive wall to the air in front of the automobile. The top front portion of the front compartment projects forward and in intended to capture the oncoming automobile, and its bottom portion slides under the front of the oncoming automobile. Mr. Shah also describes a plurality of openings in the rear compartment of the automobile air bag in order to maintain adequate pressure in the air bag and minimized rebound during collision. In addition, Shah has weighted air bags to keep them close to the ground, and transparent fabric so as not to block the vision of the driver. The air bag lies between the center of gravity and the center of buoyancy of the watercraft upon deployment.

Other patents by Yamato et al (U.S. Pat. No. 6,527,886), Toshinori Tanase (U.S. Pat. No. 6,260,878) and Yosuke Higashi (U.S. Pat. No. 6,357,786) show air bag systems with unique features.

U.S. Pat. No. 6,712,168 to Yakov Feldman has a vehicle impact, force-limiting system, using a gas generator located away from the crumble zone of the vehicle, such as the top of the vehicle, and directed along the longitudinal axis of the vehicle. The gas generator is activated by bumper sensors after the onset of impact, as is customary for internal airbags deployment, or manually by vehicle occupants before perceived collision.

The National Accident Statistics Study have shown that more than 90% of accidents causing air bag deployment occur at crash speeds at 30 mph or less at the time of impact and about 80% of air bag deployments occur below 20 mph. Moreover, the U.S. Federal Government safety regulations require that motor vehicle air bags protect unbelted front seat occupants in frontal barrier crashes where the vehicle is traveling at 30 mph at impact. These strict requirements have led to the installation of the so called "aggressive" air bags that have caused serious injuries and even death. Various means have been proposed to overcome the potential hazards associated with conventional interior air bags. For example, U.S. Pat. No. 5,871,231 to Richards et al suggests a variable-volume and variable-inflation air bag.

Exterior bags cause deceleration primarily upon impact with other vehicles or objects. Exterior bags have limited distance to collision structure as after inflation, exterior air bags begin to loose pressure. Also, in order to provide safe and effective deceleration, exterior airbags must be voluminous, thereby necessitating long inflation time before impact. Such airbags potentially obstruct the view of the vehicle occupants. In addition, upon deployment of exterior air bags, Bernoulli wind forces may cause undesirable lift of air bags. In order to rectify some of these issues, U.S. Pat. No. 6,106,038 to Peter A. Dreher includes a strip of porous material on the upper side of the bag to create a vent with an upward jet that will cause a downward force on the air bag. This air bag also has a 10 to 40 degrees backward slant on a front surface of the air bag creating an aerodynamic foil that pushes the bag downward as it moves forward through the air.

U.S. Pat. No. 6,227,325 to Reza H. Shah proposes that air bags be weighted such that upon inflation, the air bag will stay close to the pavement to ensure that the air bag would not rise above the hood of the vehicle.

Yet another limitation of an exterior inflatable safety device is that it typically requires large storage space near the exterior of the vehicle and is costly to replace. Once deployed, the external air bags usually render the vehicle inoperable.

What is needed is a system that will prevent collisions by emitting one or more jets of a liquid prior to impact.

SUMMARY

A collision prevention system for a variety of conveyances of vehicles includes one or more propulsion devices such as inflators that, when ignited, produce one or more jets of liquid under high pressure, for example starting within 20 milliseconds from the time of deployment, and directed exterior to a vehicle in motion. The jets have predetermined direction, velocity, force, volume, and duration. Controlled deceleration of the index vehicle is accomplished by extending the range of the propulsion jets to start at a distance before impact that would result in safe deceleration. The jets may be continuous, intermittent, simultaneous or sequential. For each propulsion device, there are one or more propulsion jets that control speed and direction of the vehicle. Rapid sequence cameras, laser, radar, ultrasound sensors, and holographic projectors measures parameters of speed, acceleration, deceleration and vehicle orientation (upright or turned over) relative to road surface and detect water immersion. In some embodiments, the sensors and holographic projectors located behind the front and rear windshield (or windscreen). The holographic projectors project holographic dynamic images of the index vehicle on the road surface in front and behind the vehicle proportional to the speed of the index and trailing vehicles. In some embodiments, continuous loop recording measures and records operational parameters of the index vehicle. The sensors are used to predict imminent collision. In some embodiments, once an imminent collision condition is detected, audio/video images are stored on storage media. Alternatively, the system may be triggered by imminent vehicle break-in, or incoming objects such as other vehicles or missiles.

The present application presents a method to absorb the shock of the impact outside the vehicle just before impact, while minimizing the risk of rapid deceleration and rebound. By way of ejecting a liquid using an inflator prior to impact, in some accidents, will actually prevent the triggering of the inflators of the customary interior or exterior air bags if the collision sensor-triggered impact shock threshold is not exceeded. It is anticipated that this will prevent the majority of air bag deployments in accidents, since most occur at relatively low driving speeds, and thus theoretically prevent injuries caused by interior air bag inflation, and the expense of replacing the deployed interior and/or exterior airbags and associated structures.

In order to provide deceleration devices that will save lives and minimize bodily injury and vehicle damage, the safety deceleration system is to be implemented for a variety of vehicles including, but not limited to, drones, motor vehicles, boats, ships, motorcycles, and submarines. The safety deceleration system provides for:

1. Deceleration utilizing forceful ejection of water or liquid with high velocity and force provided by, for example, an inflator. Exterior location of the orifices of pipes surrounding the index vehicle from all sides including top and bottom, leading to the inside frame and/or supporting structures of the vehicle.
2. The range of the jet of water or liquid extend for farther distances than is possible or practical with exterior airbags, therefore allowing greater time and distance for safe deceleration. In some embodiments, the range and force of the jet of liquid are variable and set to depend on factors such as the size and type of index vehicle, speed, momentum, force, and environmental factors, as well as other vehicle velocity, incoming object velocity, etc.
3. Deployment of the jet of water or liquid causes deceleration on the index vehicle without the need for contact with other objects or vehicles, based on Newton's first and third Laws of Motion, unlike exterior airbags that requires contact with the colliding object such as other vehicles or structures.
4. A detection device in the index vehicle combines, for example, rapid sequence cameras, laser, radar, ultrasonic; measures parameters of speed, acceleration, deceleration and index vehicle orientation (upright or turned over) relative to road surface, water immersion, etc. In some embodiment, the detection devices project holographic dynamic images of the index vehicle on the road surface in front and behind the vehicle proportional to the speed of the index vehicle and trailing vehicles. In some embodiments, the system documents and stores images of encroachment on the safety zone and/or holographic road images that define tailgating, whether behind the index vehicle caused by the trailing vehicle (voluntary tailgating), or in front of the index vehicle by another vehicle encroaching on safety zone and resulting in "forced tailgating" by the index vehicle.
5. Activation of the water or liquid jet is initiated by analyzing data from one or more pre-collision sensors such as radar, laser, ultrasound, or video sensors or a combination of sensors.
6. In some embodiments, indicators of signal system malfunction, as well as the readiness of inflators for deployment, and the need for replacement or repair is provided.
7. In some embodiments, rapid sequence film cameras or other imaging sensors with night vision and/or illumination capability document the events immediately (outside as well as inside the vehicle) before and after impact, saved in a storage compartment inside the vehicle or watercraft.

In some embodiments, the safety deceleration system initiates deceleration at a desirable distance before impact, by adjusting the range of the propulsion jets to provide sufficient time for safe deceleration.

In some embodiments, the safety deceleration system controls propulsion liquid jets to assist in steering the index vehicle as well as to avoid oncoming vehicles that threaten collision.

In some embodiments, the safety deceleration system includes vehicle position sensors to detect vehicle position relative to the horizontal.

In some embodiments, the safety deceleration system includes cameras and sensors that detect water immersion of a vehicle.

In some embodiments, the safety deceleration system includes propulsion jets that assist in stabilizing and steering the index vehicle and restoring normal position of the index vehicle in the event of an imminent rollover of the index vehicle.

In some embodiments, the safety deceleration system includes one or more propulsion jets deployed by, for example, inflators when a collision is imminent. The propulsion jets are simultaneous or sequential deployed to allow abating of propulsion jet deployment if a collision is no longer imminent.

In some embodiments, the safety deceleration system deters vehicle theft, by directing the jet propulsion at assailants who break into the vehicle without necessarily causing significant body harm to the assailants, including forewarning of the potential for body harm caused by their action.

In some embodiments, the safety deceleration system includes detecting and deflecting incoming missiles or projectiles such as bullets, rocks or shell fragments by propulsion jets of liquids of various viscosity, mass and velocity aimed at such objects to decelerate the objects, or change their direction away from the index vehicle.

In some embodiments, the safety deceleration system includes detecting and deflecting in incoming vehicles by propulsion jets of liquids of various viscosity, mass and velocity aimed to decelerate threatening vehicles or change the direction of threatening vehicles away from the path of the index vehicle.

In some embodiments, the safety deceleration system does not impact the index vehicle after deployment, allowing for resuming of normal driving after an impact is successfully averted, as no exterior (or interior) air bag deployment was necessary, and safe deceleration caused no body harm to the occupants of the vehicle by interior airbag deployment.

In some embodiments, the safety deceleration system includes a sensing system for detecting pre-impact conditions. The sensing system includes, for example, an audio/video image recording system having rapid sequence film cameras located/aimed inside and/or outside of the index vehicle. In some embodiments, the audio/video images associated with the accident are store in a memory unit. In some embodiments, a control system analyzes the data from the sensors and issues a control signal to control a pre-collision and collision situation and to provide for additional safety parameters during an emergency situation by directing liquid jet propulsion deployment in a controlled fashion.

In some embodiments, the safety deceleration system includes propulsion jets that surround the index vehicle from the front, sides, top and bottom thereof.

In some embodiments, the safety deceleration system includes propulsion jets that propel a volume (or mass) of liquid which is proportional to the mass of the vehicle and its acceleration or deceleration required.

In some embodiments, the safety deceleration system includes propulsion jets that contain minimal quantities of water or liquid, for low mass vehicles such as drones, small quantities of propulsion may be effective in 3 ways: changing the spatial position of the index drone in a direction opposite to the propulsion jet(s); altering the spatial position of incoming drones by the force of the propulsion jet coming out of the index drone; keeping the spatial position of the index drone at the same location by utilizing simultaneous jets of equal force (product of mass times acceleration) at 180 degrees of each other. Since incoming missiles travel at speeds exceeding 1,000 meters per second, deployment of the propulsion jets typically start within 5 milliseconds, the time it takes an inflator to activate the explosion that leads to propulsion of the liquid (e.g. one liter of liquid). Such jet will have the force it takes to stop, slow down or deflect incoming missiles, or other drones.

In other embodiments, the safety deceleration system includes propulsion jets that contain large quantities of liquid, such as for aircraft in order to cause effective deceleration prior to impact, based on Newton's third law of motion.

In some embodiments, the safety deceleration system includes activation of the propulsion jets affected by the control system having a processor which analyzes data from a variety of pre-collision sensors, including radar, lasers, ultrasonic devices, IR devices, or any combination of sensors that measure the parameters of the index vehicle indicative of a pre-impact condition. The force and number of jets are then controlled to provide for safe vehicle deceleration.

In some embodiments, the safety deceleration system includes detection of the type of threat by characteristics such as velocity, size and shape; and activation of corresponding propulsion jets, and assignment of appropriate force of propulsions needed to decelerate and/or change direction. For example, missiles or projectiles travel at a far greater speed than vehicles and have different sizes and shapes.

In some embodiments, the safety deceleration system functions when the index vehicle is not able to decelerate using manual braking system due to icy or slippery roads, as well as for aircrafts and watercrafts.

In some embodiments, the safety deceleration system includes a plurality of propulsion jets that are aimed outward from the vehicle's exterior, with a range, speed, force, pressure, volume, and duration that is determined by the parameters of imminent collision.

In some embodiments, the safety deceleration system includes inflators that generate the forces that drive stored liquid to be ejected at high pressure, speed, and volume. Liquids produced are nontoxic and environmentally safe.

In some embodiments, the safety deceleration system includes telescoping sensors that are positioned at an adjustable and selective distance from the body of the vehicle.

In some embodiments, the safety deceleration system includes sensing index vehicle parameters by a plurality of sensors and supplying data corresponding to the measured parameters to a processor unit then analyzing the data to determine if there is a pre-collision situation by measuring acceleration rate of the target vehicle exceeds a predetermined threshold or deviates from a predetermined "safe" range then if there is a pre-collision situation, deploying one or more propulsion jets; adjusting the number, force, volume, and sequence of the propulsion jets to control deceleration rate of the vehicle until the vehicle comes to a stop, or the threat of a collision ceases to exist.

The present invention relates to a method and system for collision prevention or abatement, thereby protecting both passengers and vehicles before imminent impact. In particular, the present invention relates to pre-impact safety deceleration system that includes one or more inflators that generate a force causing a volume of water or other liquid to be ejected outwards with a predetermined range, force, velocity, volume and duration. The propulsion jets act to effect controlled deceleration, as well as aid in steering or stabilizing of the vehicle. The jets exit from anywhere surrounding the vehicle and may extend for farther distances than is possible with exterior airbags to provide timely deceleration.

In some embodiments, rapid sequence cameras, laser, radar, ultrasound and holographic projectors are located behind the front and rear windshield (or windscreen) to measure parameters of speed, acceleration, deceleration and vehicle orientation (upright or rollover) relative to road surface, and for projecting holographic dynamic images of the index vehicle on the road surface in front and behind the vehicle proportional to the speed of the index and trailing vehicles. The system documents and stores images of encroachment such as tailgating.

In the event of imminent collision, the present invention includes pre-collision sensors that trigger the ejection of a liquid, once a pre-collision condition has been determined. In the safety system, rapid exposure rate cameras continuously record the audio/video images of the events external and internal to the vehicle. Once pre-collision is detected, the system stores the audio/video images recorded before, during and immediately after the collision in order to provide documentation of events surrounding the impact. The audio/video images are stored in a memory for further analysis. The safety system monitors velocities of one or more vehicles and determines if a collision occurred based upon a measured acceleration or deceleration rate. It is known that a typical vehicle has a limited acceleration rate, limited by horsepower, mass of the vehicle, tire friction, etc. Likewise, it is known that a typical vehicle has a limited deceleration rate, limited by brake performance, mass of the vehicle, tire friction, etc. In some embodiments, the maximum possible deceleration and acceleration for any vehicle is preprogrammed (e.g. as a factory settings) as a predetermined value. Any deceleration beyond that point is, by definition, a collision.

In one embodiment, a vehicle safety system is disclosed including one or more sensors interfaced to an index vehicle and a computer that is operatively interfaced to the one or more sensors, thereby the computer obtains sensor data from the one or more sensors. One or more propulsion devices are operatively coupled to the computer such that the computer controls activation of each propulsion device. The computer executes software that causes the computer to iteratively calculate a size of a safety zone based upon the sensor data and to iteratively determine if an object enters the safety zone as well as if a collision with the object is imminent. If it is determined that the collision with the object is imminent, the software causes the computer to signal one or more of the propulsion devices (e.g., inflators) to emit a jet of liquid, thereby decelerating and/or changing direction of the index vehicle and/or of the object.

In another embodiment, a method of avoiding a collision is disclose including determining if a collision between an index vehicle and an object is imminent using at least a velocity of the index vehicle and a velocity of the object and if the collision between the index vehicle and the object is imminent, emitting one or more jets of liquid from the index vehicle to decelerate that index vehicle and/or change a direction of travel of the index vehicle.

In another embodiment, a vehicle safety system is disclosed including one or more sensors interfaced to an index vehicle and a processor that is interfaced to the one or more sensors, thereby the processor obtains sensor data from the one or more sensors. There are one or more propulsion devices, each operatively coupled to the processor such that the processor controls activation of each propulsion device. Software running on the processor causes the computer to iteratively calculate a delta (difference in) velocity between the index vehicle and an object in a travel path of the index vehicle and a distance between the index vehicle and the object. The software uses the delta velocity and distance to calculate if a collision between the index vehicle and the object is imminent and if it is determined that the collision between the index vehicle and the object is imminent, the software causes the computer to signal one or more of the propulsion devices to emit a jet of liquid, thereby decelerating and/or changing direction of the index vehicle and/or of the object.

In some embodiments, a vehicle image is projected posteriorly when a vehicle backs out of a parking space, warning pedestrians and drivers of other vehicles that the vehicle is about to enter their path of travel. Similarly, mechanisms are provided to assist the driver of the vehicle that backs out of a parking space so that the driver can better see pedestrians and the other vehicles approaching.

In some embodiments, a video record of the encroaching vehicle is maintained. This video record serves as a deterrent if a complaint is issued to law enforcement as supported by such video record.

When driving at high way speeds, there is no reliable way for a human driver to determine safe distances between vehicles. Counting two seconds and using a reference point is an approximation and even less reliable when road conditions such as rain or snow is a factor. The disclosed system continuously and accurately measures a safe inter-vehicle distance, both in front and behind the vehicle. This dynamic "safety zone" is then shared with other vehicles by projecting a flat image or hologram showing the instantaneous "safety zone." This projection is visible to the driver of the vehicle as well as drivers of nearby vehicles that are potential sources of a collision. The flat image or holographic image is emitted automatically. The size of the "safety zone" is calculated using a computer that calculates safe distances to other vehicles based upon factors such as speed, inertia, tire condition, driver experience, road conditions (wet, dry, snow-covered, ice-covered, etc.), and weather. The flat image or holographic image will be an aid to all vehicles indicative of safe paths and speeds. In some embodiments, video cameras document violations such as tailgating by another driver behind the index vehicle or tailgating forced on the index vehicle by another driving entering the safety zone in front of the index vehicle.

In some embodiments, the flat image or holographic image is bent or curved to reflect turning directions such as U-turns or left turns.

In some embodiments, parking assistance is provided projecting vehicle dimensions relative to the available parking space, to help guide the driver to fit within the parking space.

The flat image's and/or holographic image's dimensions are dynamic and expand or shrink as dictated by weather conditions such as rain, snow or fog, as well as road conditions (e.g. wet, dry, snow-covered, ice-covered), status of the tires, and driver experience.

In some embodiments, the flat image's and/or holographic image's dimensions expand or shrink as dictated by the speed of a trailing vehicle with respect to the speed of the index vehicle that is projecting the flat image and/or holographic image.

In some embodiments, the anterior (front) flat image and/or holographic image is displayed with a dimension proportional to the speed of the index vehicle as the index vehicle approaches the vehicle that is ahead in order to allow for safe deceleration and is visible to vehicles in nearby lanes. The image is activated when the speed of the index vehicle exceeds the speed of the vehicle ahead and the distance between the two vehicles approaches a critical distance below which safe deceleration of the vehicle is problematic. For example, the image is displayed anteriorly (forward) once the vehicle is at a speed and distance as to not be able to decelerate safely in the event that the vehicle ahead suddenly decelerates or stops. In some embodiments, if the vehicle's speed is less than the speed of the vehicle ahead, and the distance between the two vehicles exceeds a distance needed for safe deceleration, then the flat image and/or holographic image is not be displayed.

In some embodiments, the generation of the flat images and/or holographic images is blanked for certain vehicle speeds in the forward direction. For example, the flat images and/or holographic images is emitted only at speeds in a forward direction that exceed 15 miles per hour.

In some embodiments, the dimensions of the flat and/or holographic image of the index vehicle posteriorly is activated based on the speed of a trailing vehicle traveling at speeds greater than the speed of the index vehicle, but the image is not displayed until the trailing vehicle approaches a distance below which safe deceleration of the trailing vehicle is not feasible.

In some embodiments, generation of the flat images and/or holographic images is triggered by shifting into reverse such as when exiting from a parked position, regardless of speed.

Some embodiments provide a panoramic video display from a rear camera mounted to a flexible rod that telescopes in a rearward direction when the vehicle is shifted into reverse as when exiting from a parked position.

In some embodiments, the system includes an audio/video image recording system having rapid sequence film cameras located inside and outside of the vehicle. The audio/video images associated with imminent collision are stored in a memory unit.

In some embodiments, the rear camera telescopes outwardly when backing up and is equipped with sensors in order to determine the safety of telescoping against objects or pedestrians.

The sensor system deployed inside, on, and outside on the body of the vehicle includes a plurality of sensors, such as radar, lasers, ultrasound devices, infrared devices, Doppler sensors, etc. The sensors provide data to a processor indicating, for example, the vehicle speed, deceleration rate, wind speed, time to impact, distance to an obstacle, etc. Other parameters are pre-determined and stored as data by the vehicle manufacturer such as weight of the vehicle, dimensions of the vehicle, maximum acceleration and deceleration, brake performance, etc.

In one embodiment, an accident avoidance system is disclosed including an image projection system interfaced to a rear surface of an index vehicle. The image projection system is operative to project an image behind the index vehicle. One or more sensors are interfaced to the index vehicle for obtaining sensor data related to a speed of the vehicle, road conditions (e.g. wet, dry, snow-covered, ice-covered), weather (e.g. rain, snow, fog, sleet), ambient lighting conditions (e.g. daylight, darkness, nighttime road lighting), tire pressure, brake wear, etc. The system includes a computer that has preprogrammed data regarding the index vehicle (e.g. brake performance, vehicle weight, stopping ability of the vehicle, and tire configuration). The computer is interfaced to the one or more sensors for obtaining the sensor data that includes at least a speed of the index vehicle. The computer is also coupled to the image projection system for controlling projection of the image. The computer has software that calculates a size of a safety zone based upon the preprogrammed data and the sensor data (including the speed of the vehicle) and then the software controls the image projection system to project an image behind the index vehicle that is proportional to the size of the safety zone.

In another embodiment, a method of avoiding an accident includes measuring a speed of the index vehicle and at least one parameter selected from the group consisting of a road surface type, a road condition, a weather, and tire pressure. A rear safety zone is calculated from the speed of the index vehicle or the delta speed of the index vehicle relative to other vehicles, and at least one preprogrammed parameter related to the vehicle and an image is projected behind the index vehicle. The size of the image projected behind the index vehicle is proportional to the speed of the trailing vehicle, but in some embodiments, the image is not be displayed until the trailing vehicle approaches the rear safety zone defined as the distance needed for safe deceleration of the trailing vehicle. The image provides a visual reference for the vehicle that is following the index vehicle to judge a safe following distance.

In another embodiment, an accident avoidance system is disclosed including an image projection system interfaced to an index vehicle. The image projection system is configured to project an image behind the index vehicle. The system includes one or more sensors that are interfaced to the index vehicle and a computer. The computer has preprogrammed data regarding the index vehicle (e.g. brake performance, vehicle weight, and tire configuration), as well as data regarding an average trailing vehicle. The computer is interfaced to the one or more sensors, obtaining sensor data from the one or more sensors such as sensors that measure a speed of the index vehicle, a speed of a trailing vehicle, road conditions (e.g. wet, dry, snow-covered, ice-covered), weather (e.g. rain, snow, fog, sleet), ambient lighting conditions (e.g. daylight, darkness, nighttime road lighting), tire pressure, brake wear, etc. The computer is operatively coupled to the image projection system for controlling projection of the image. Software is executed by the computer to calculate a size of a safety zone based upon the preprogrammed data and the sensor data and to control the image projection system to project an image behind the index vehicle that is the size of the safety zone.

In another embodiment, the index vehicle is equipped with cameras and sensors that determine the type and specs of the trailing vehicle, such as whether it is a truck, a bus or a minivan to estimate the safe deceleration distance based on published data.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
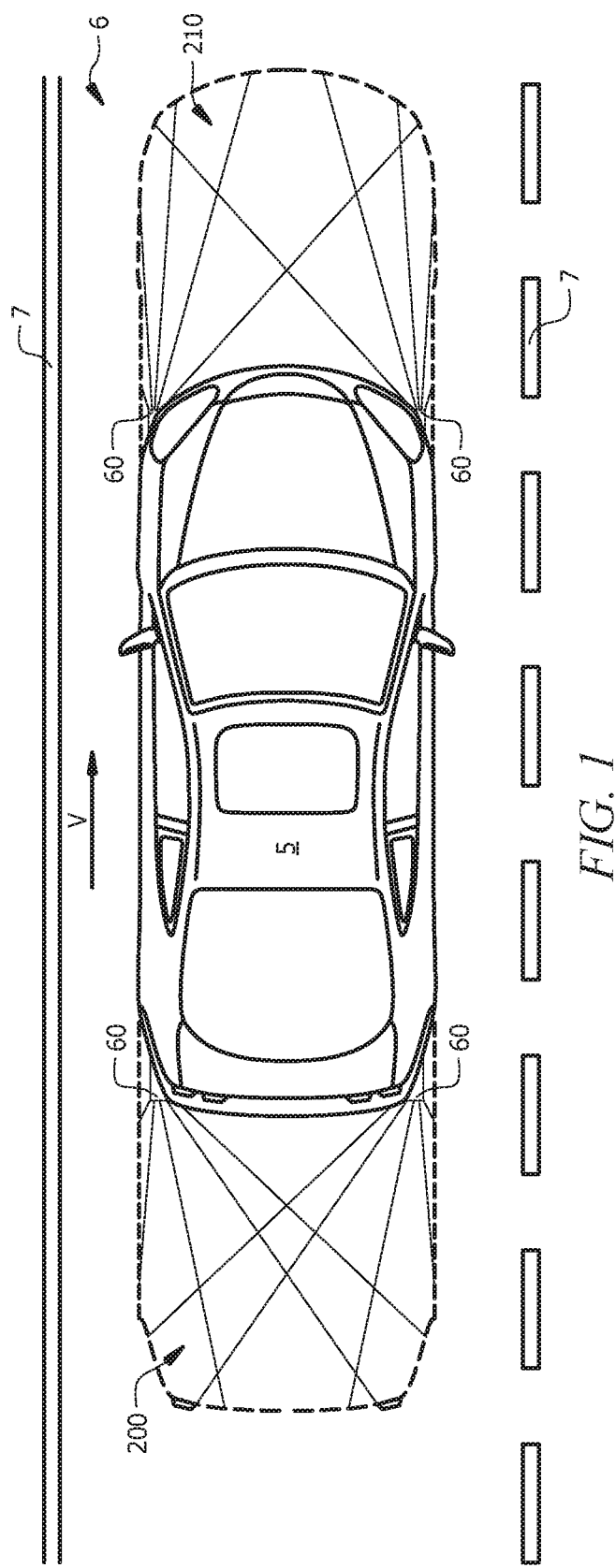
FIG. 1 illustrates a schematic view of a vehicle with illumination zones of the system for avoiding accidents.

Reference will now be made in detail to the presently preferred embodiments of the invention, examples of which are illustrated in the accompanying drawings. Throughout the following detailed description, the same reference numerals refer to the same elements in all figures.

Throughout this description, the term vehicle is any motorized or manually operated vehicle, including, but not limited to, automobiles, motorcycles, bicycles, trucks, boats, drones, etc. Also, throughout this description, the term "index vehicle" is used to identify the vehicle that is equipped with the described system as opposed to the leading vehicle (that which is in front of the index vehicle) or trailing vehicle (that which is behind the index vehicle), or otherwise such as incoming missiles or drones.

Throughout this description, one typical vehicle control system is used as an example of integrating the system for avoiding accidents into a vehicle. It is fully anticipated that any vehicle control system is present in any target vehicle and the system for avoiding accidents is either integrated into the vehicle control system or operates side-by-side with the vehicle control system or operates independently of the vehicle control system.

Prior art "dynamic imaging" refers to generation of unlimited versions and changing the size and format of images using one master file (Dynamic Media Classic).

The term "dynamic imaging" in the current disclosure is defined as imaging of a vehicle that is projected on or above the ground (such as a road) in front, behind or beside the vehicle and has dimensions that increase or decrease in the typical axis of movement of the vehicle depending on parameters such speed of the index vehicle, and speed of a trailing vehicle, as well as the difference (delta) speeds of the index vehicle to other vehicles, in order to provide an accurate visual safety zones surrounding a vehicle. The dynamic image is displayed posteriorly once the trailing vehicle approaches a safety deceleration zone depending on the speed of the trailing vehicle regardless of relative to the speed of the index vehicle. Similarly, the dynamic image is displayed anteriorly with longitudinal dimensions proportional to the speed of the index vehicle once the distance to the vehicle ahead approaches the safety deceleration zone of the index vehicle. The rate of change in the dynamic image longitudinal dimensions corresponds to acceleration and deceleration. The acceleration and/or deceleration also provide an accurate indicator of the occurrence as well as the severity of a collision. For example, any acceleration or deceleration that exceeds 1.1 g is likely the result of a collision, and the severity increases with the increase in the gravitational force, such as above 10 or 15 g. Note that 1 g of acceleration (or deceleration) is 32 feet per second per second (32 feet per second2). Also note that 0.7 g is possible for a skilled driver braking and as high as 1 g for a skilled driver braking on a dry surface with the best know tires and a very good braking system.

The system for avoiding accidents is based on current theory and concept. Standard safety precautions must always be followed. The persons or corporations implementing the disclosed invention are responsible for providing accurate information to those using this system (drivers), particularly as it pertains to risks versus potential benefits.

Referring to FIGS. 1 through 7, the operation of the system for avoiding accidents will be explained. In order to avoid accidents, it is important to maintain a safe distance between vehicles in order to provide sufficient time to react to unexpected events such as an animal entering the roadway, traffic congestion, etc. Many people use one car-length per ten miles per hour of speed as a rule of thumb. This is a good rule, but it is often difficult for a driver to judge the length of a car. Further, the stopping time of a vehicle varies based upon factors other than speed of the vehicle such as tire condition, road conditions, temperature, etc. So, even if there was a way for a driver to accurately judge six car lengths when driving at 60 miles per hour, more space is required when it is raining, icy, on gravel road, when one's tires are worn, etc. Stated differently, it is not humanly possible to accurately judge the safety distance while driving.

To overcome the inaccuracies and misjudgments of having the driver continuously judge an appropriate distance, the system for avoiding accidents calculates the appropriate distances based upon various data and sensor data and projects either a hologram or a flat image on a roadway surface 6 showing the suggested distances between vehicles. Note that there is no limitation on the type of roadway surface ranging from asphalt, concrete, gravel, sand, grass fields, cobble stone, etc., each having different stopping characteristics.

In FIGS. 1-7, an index vehicle 5 is shown traveling on the roadway surface 6 (for clarity, in FIGS. 1-6, the index vehicle 5 is traveling generally from left to right within a lane between lane markers 7). In FIG. 1, a rear safety zone 200 and a front safety zone 210 are projected by one or more projectors 60, typically laser projectors. A longitudinal dimensions of the front safety zone 210 and the rear safety zone 200 is determined by a processor 70 (see FIG. 9) analyzing stored data (e.g. vehicle weights, vehicle dimensions, vehicle stopping distance on dry pavement, tire age . . . ) and data from one or more sensors such as a camera 93, microphone 95, ambient light sensor 50, roadway condition sensor 48, speed sensor 40, etc. (see FIG. 9). The processor then controls the one or more projectors 60 to project an image or outline on the pavement that represents a safe inter-vehicle distance based upon the stored data and data from the sensors. For example, if based upon the stored data, the stopping distance of the index vehicle 5 at 60 miles per hour is 80 feet on dry pavement, and then the front safety zone 210 will be projected on the road, occupying approximately 80 feet in front of the index vehicle 5. If it is determined from the data from the sensors that the road is wet (e.g. from rain), then a greater stopping distance is calculated based upon the wet surface and, for example, a the front safety zone 210 will be projected on the road, occupying, for example, approximately 120 feet in front of the index vehicle 5.

Similarly, for example, if based upon the stored data, the stopping distance of a trailing vehicle at 60 miles per hour is 80 feet on dry pavement, then the rear safety zone 200 will be projected on the road, occupying approximately 80 feet behind the index vehicle 5. If it is determined from the data from the sensors that the road is wet (e.g. from rain), then a greater stopping distance for the trailing is calculated based upon the wet surface and, for example, a the posterior safety zone will be projected on the road, occupying, for example, approximately 120 feet behind the index vehicle 5. The image is projected once the trailing vehicle approaches the safety deceleration zone of an average trailing vehicle based on its speed and road conditions.

Figure 2:
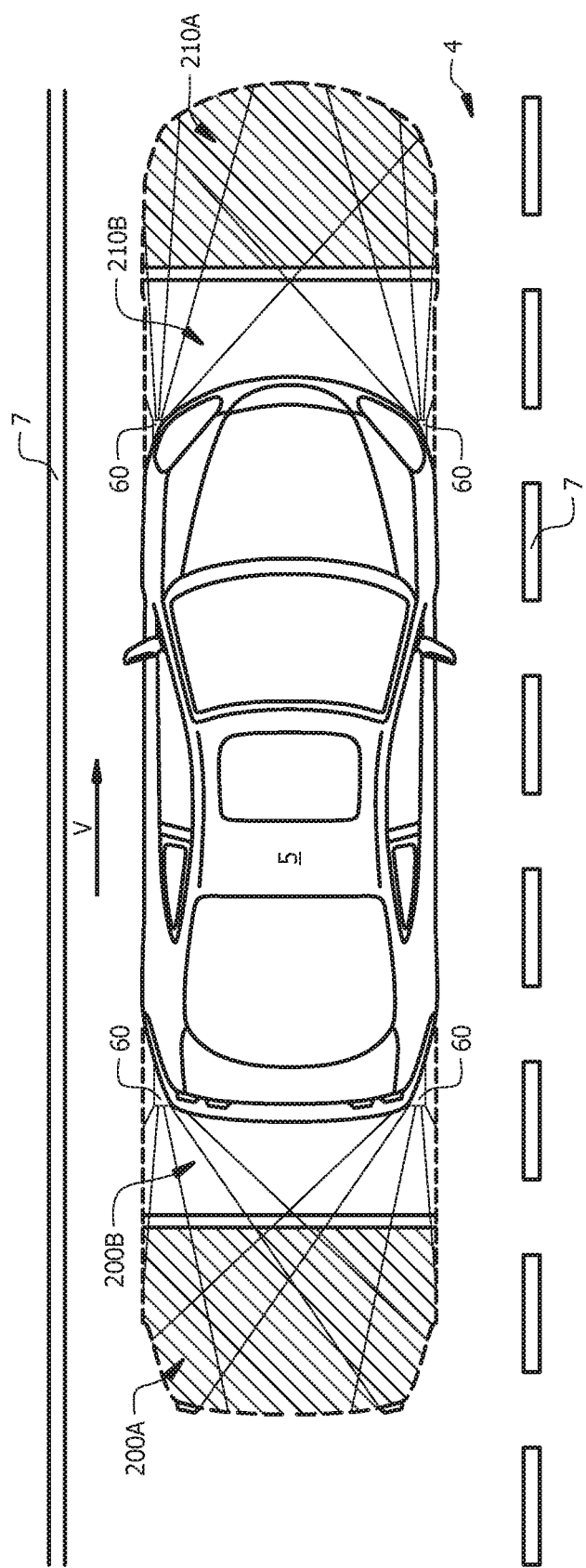
FIG. 2 illustrates a second schematic view of a vehicle with illumination zones of the system for avoiding accidents.

In some embodiments, the rear safety zone 200 and a front safety zone 210 are projected by one or more projectors 60 that have the ability to project multiple colors, typically laser projectors. In FIG. 2, the rear safety zone 200 includes two differently colored/shaded areas, a warning area 200A and a danger area 200B. For example, the warning area 200A is projected in yellow and a danger area 200B is projected in red. Likewise, also in FIG. 2, the front safety zone 210 includes two differently colored/shaded areas, a warning area 210A and a danger area 210B. For example, the warning area 210A is projected in yellow and a danger area 210B is projected in red. There is no limitation on the colors used, the number of zones, the use of patterns instead of colors, etc.

Figure 3:
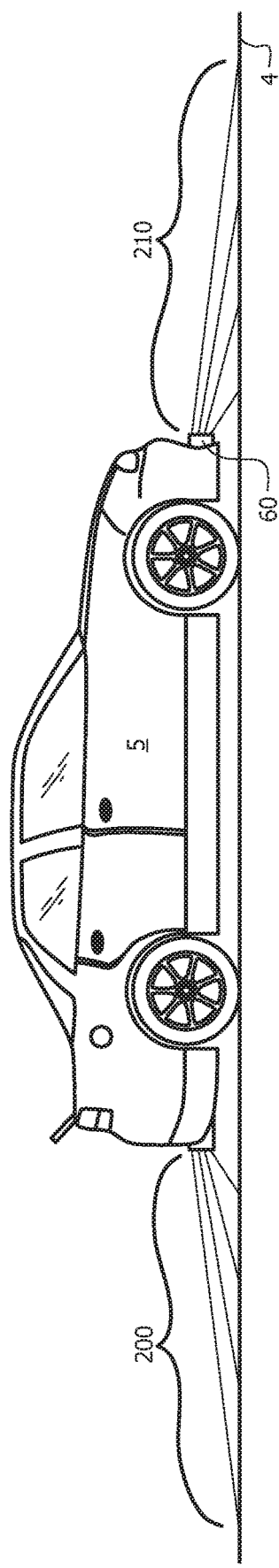
FIG. 3 illustrates an elevation view of a vehicle with illumination zones of the system for avoiding accidents.

In FIG. 3, a side elevation view of the projection of the front safety zone 210 and the rear safety zone 200 is shown.

Figure 4:
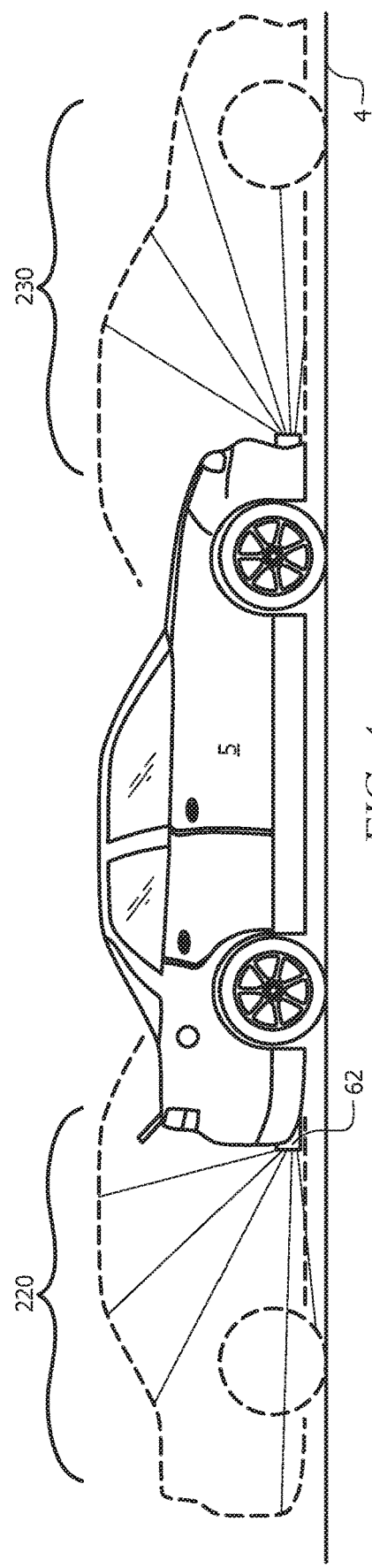
FIG. 4 illustrates a second elevation view of a vehicle with illumination zones of the system for avoiding accidents.

In FIG. 4, a side elevation view of the projection of the front safety zone hologram 230 and the rear safety zone hologram 220 is shown. In this example, holograms 220/230 are projected in the space in front and behind the index vehicle 5 to provide an image of a larger vehicle to better warn the driver of a safe following distance and to better warn other drivers of a safe distance between those driver's vehicles and the index vehicle 5. In this example, hologram projectors 62 project the front safety zone hologram 230 and the rear safety zone hologram 220 under control of the processor 70.

Figure 5:
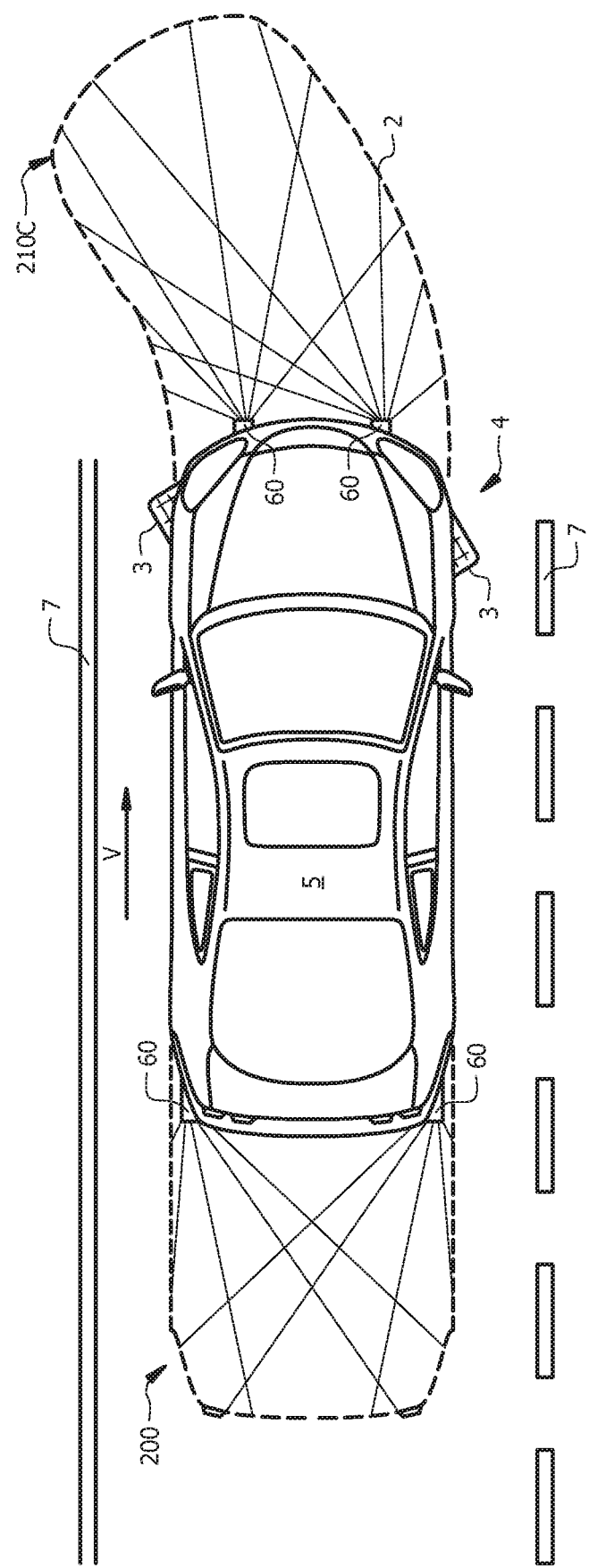
FIG. 5 illustrates a third schematic view of a vehicle with illumination zones of the system for avoiding accidents.

In FIG. 5, it is shown how the front safety zone 210 changes shape into a curved front safety zone 210C as the driver turns the steering wheel of the index vehicle 5, as shown by the front tires 3 being at an angle with respect to the traveling direction of the index vehicle 5. In this, the curved front safety zone 210C is shaped and sized to warn others, including pedestrians, and to warn the driver of the index vehicle 5 as to the path of the index vehicle 5 and how much space is required for the index vehicle 5 to safely stop.

Figure 6:
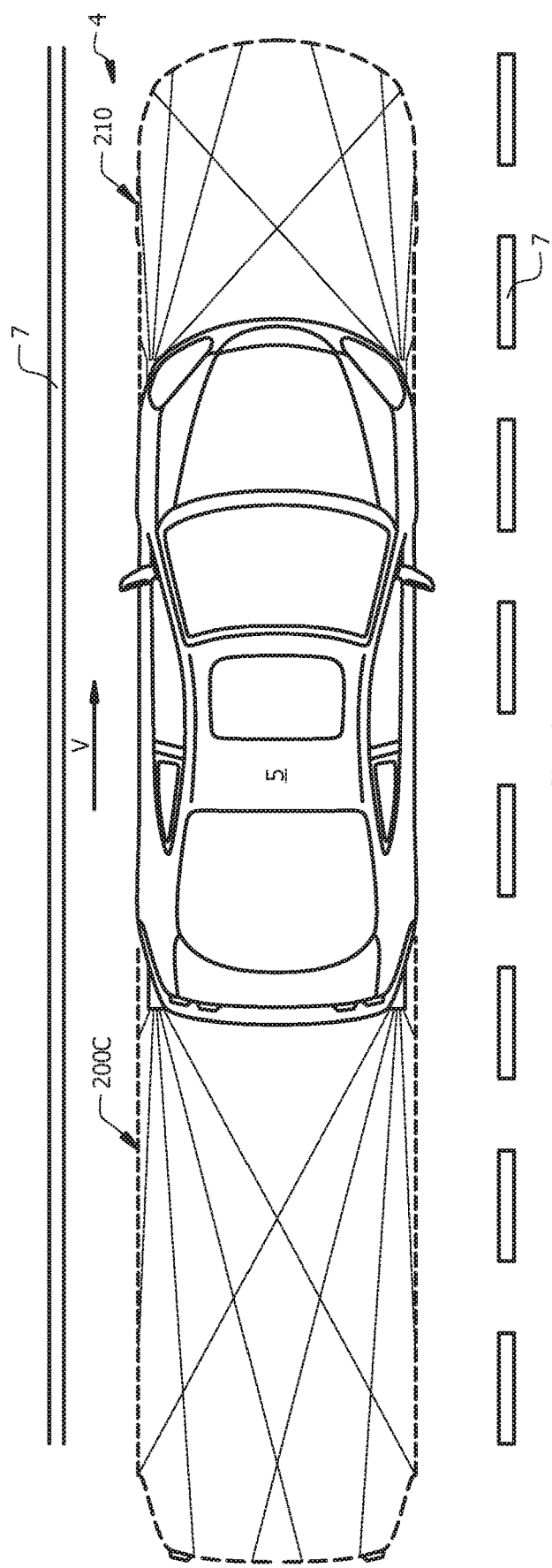
FIG. 6 illustrates a fourth schematic view of a vehicle with illumination zones of the system for avoiding accidents.

In FIGS. 1-4, the rear safety zone 200 and a front safety zone 210 are projected by one or more projectors 60 or hologram projectors 62 based upon a first set of data. The processor controls the one or more projectors 60 and/or hologram projectors 62 to project an image or outline on or above the pavement that represents a safe inter-vehicle distance based upon the stored data and data from the sensors (e.g. a flat image on the pavement or a holographic image above the pavement). For example, in FIGS. 1-4, the rear safety zone 200 is of a size based upon the stored data, the stopping distance of the index vehicle 5 at a first set of conditions (e.g. speed, pavement type, pavement conditions, tire conditions, etc.). In FIG. 6, a longer rear safety zone 200C is projected on the road surface 4, informing following vehicles that more inter-vehicle stopping distance is needed between the following vehicle and the index vehicle 5, based upon current conditions.

Again, the longitudinal dimensions of the rear safety zone 200 and a front safety zone 210 as projected by one or more projectors 60 or hologram projectors 62 is dependent upon various stored data and measured data from sensors. In one example, one of the sensors is an accelerometer 51 (see FIG. 9). In such, the acceleration of the index vehicle 5 is readily available. Using data from the accelerometer 51 provides the processor 70 and algorithms knowledge of whether the index vehicle 5 is accelerating or decelerating. Further, in examples in which a camera 93, radar system 44, or sonar system 46 are available, the processor 70 and algorithms have knowledge of whether the surrounding vehicles are accelerating or decelerating with respect to the index vehicle 5. This will provide warning to the driver of the index vehicle 5 of an imminent collision, for example, if the index vehicle 5 is decelerating (as determined by the accelerometer 51) and the following vehicle is accelerating (as determined by one or more of a camera 93, a radar system 44, or a sonar system 46. The radar system 44, sonar system 46, and/or the camera(s) 93 are also used to determine a distance between the vehicle and other vehicles/objects.

Further, in embodiments having an accelerometer 51, there are anticipated embodiments in which the processor 70 and algorithms determine if a collision has occurred with a high degree of accuracy, including (also in some embodiments) the location of the collision and the severity of the collision. Knowledge of a collision is derived from instantaneous acceleration (or deceleration) in any direction. Given current technology, the fastest car acceleration in 2017 is about 0 to 60 miles per hour in 2.5 seconds, which represents around about 1.09 g (one g is the acceleration due to gravity at the Earth's surface defined as 9.80665 meters per second squared, or 9.80665 newtons of force per kilogram of mass). Therefore, acceleration greater than 1.1 g is likely to have been caused by a collision as such acceleration is not likely given current vehicle technology. Similarly, vehicles have a maximum deceleration of less than 1.0 g, by experienced drivers on dry road conditions, and with good tires. A deceleration greater than 1.1 g is likely caused by a collision. Thus, any acceleration or deceleration of greater than 1.1 g defines a collision with a high likelihood of certainty. Such a collision is detected instantaneously at the time of occurrence. In some embodiments, notification of the collision is transmitted through the wide-area transceiver 17, and, in some embodiments, is reported to the appropriate authorities for immediate action. In addition, to the detection of the collision, in some embodiments, the magnitude of acceleration and/or deceleration and impact is also transmitted. For example, an absolute acceleration value or a classification of the collision: moderate, severe, or potentially lethal depending on the acceleration/deceleration. For example, a moderate is between 1.1 g and 5 g; a severe collision is between 5 g and 10 g; and a potentially lethal collision is anything over 10 g. The notification, including the magnitude of the collision, is important since severe collisions often require emergency medical services to save lives and minimize disability while a low impact fender bender collision often only requires exchange of information between those involved and/or arrival of a law enforcement person. Further, using the positioning system 91, in some embodiments, the location of the collision is also reported through the wide-area transceiver 17.

In all embodiments, it is anticipated that the image projection using the projectors 60 or the hologram projectors 62 are only activated when needed to warn of less-than-desirable or dangerous inter-vehicle (or inter-object) spacing. For example, if another vehicle is 200 feet behind the index vehicle 5, then the image projection using the projectors 60 or the hologram projectors 62 are not activated. The image projection using the projectors 60 or the hologram projectors 62 is initiated, for example, when the inter-vehicle spacing is less than what is deemed safe based upon the present conditions, including, for example, vehicle speeds, road conditions, tire conditions, vehicle data, reaction times, etc. For example, if the index vehicle 5 is moving at 60 mph and a trailing vehicle is moving at 70 mph, the delta speed is negative 10 mph. Any values less than zero indicates that the inter-vehicle distance is reducing and the trailing vehicle is catching up to the index vehicle 5. The projectors 60 or the hologram projectors 62 are activated to project the rear safety zone 200/200A/200B/200C once the trailing vehicle approaches the danger zone (or warning zone). It should be noted that the dimensions of the rear image of the index vehicle is proportional to the speed of the trailing vehicle, but image projection is activated only when the trailing vehicle approaches the safety deceleration distance of an average vehicle with adequate tires, braking systems, etc. On the other hand, if the index vehicle 5 is moving at 70 mph and a trailing vehicle is moving at 60 mph, the delta speed is positive 10 mph. Any values greater than zero indicates that the inter-vehicle distance is increasing, and the trailing vehicle is getting further away from the index vehicle 5. In this example, once the inter-vehicle distance is greater than the danger zone, the projectors 60 or the hologram projectors 62 are deactivated. Once the index vehicle 5 approaches a leading vehicle (one in front of the index vehicle 5), the roadway projecting devices 60 or the hologram projectors 62 are activated to project the front safety zone 210/210A/210B/210C to warn the driver of the index vehicle 5 not to follow the leading vehicle too closely.

Figure 7:
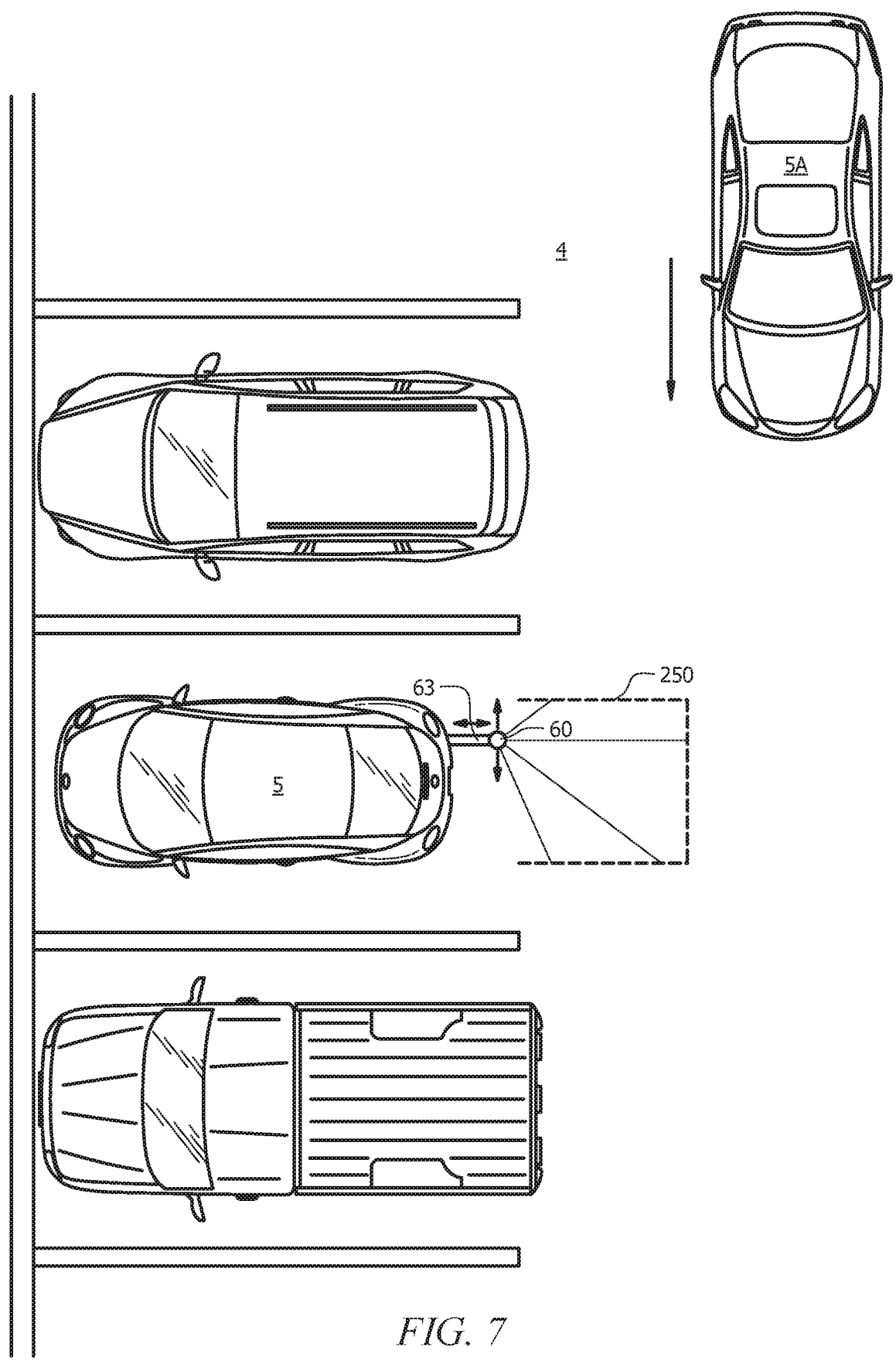
FIG. 7 illustrates a fifth schematic view of a vehicle with illumination zones of the system for avoiding accidents.

Referring to FIG. 7, a telescoping assembly 63 is shown extending from the rear of the index vehicle 5. As it is often difficult to back out of a parking space, the telescoping assembly 63 includes a projector that provides a projection 250 on the surface behind the index vehicle 5 that warns a driver of an approaching vehicle 5A as to where the index vehicle 5 will be traveling. Further, in some embodiments, the telescoping assembly 63 includes one or more cameras/lenses that image the parking area. The images from the cameras are then displayed, for example, on the dashboard display (see FIG. 9) to warn the driver of the index vehicle 5 that approaching vehicle 5A is near. In a preferred embodiment, the telescoping assembly 63 is either flexible or is hinged to reduce the chance of damage should an object come into contact with the telescoping assembly. In some embodiments, the telescoping assembly 63 includes sensors for detecting objects in the rearward path of the index vehicle 5 and to limit extension of the telescoping assembly 63 so as not to hit such objects.

Figure 8:
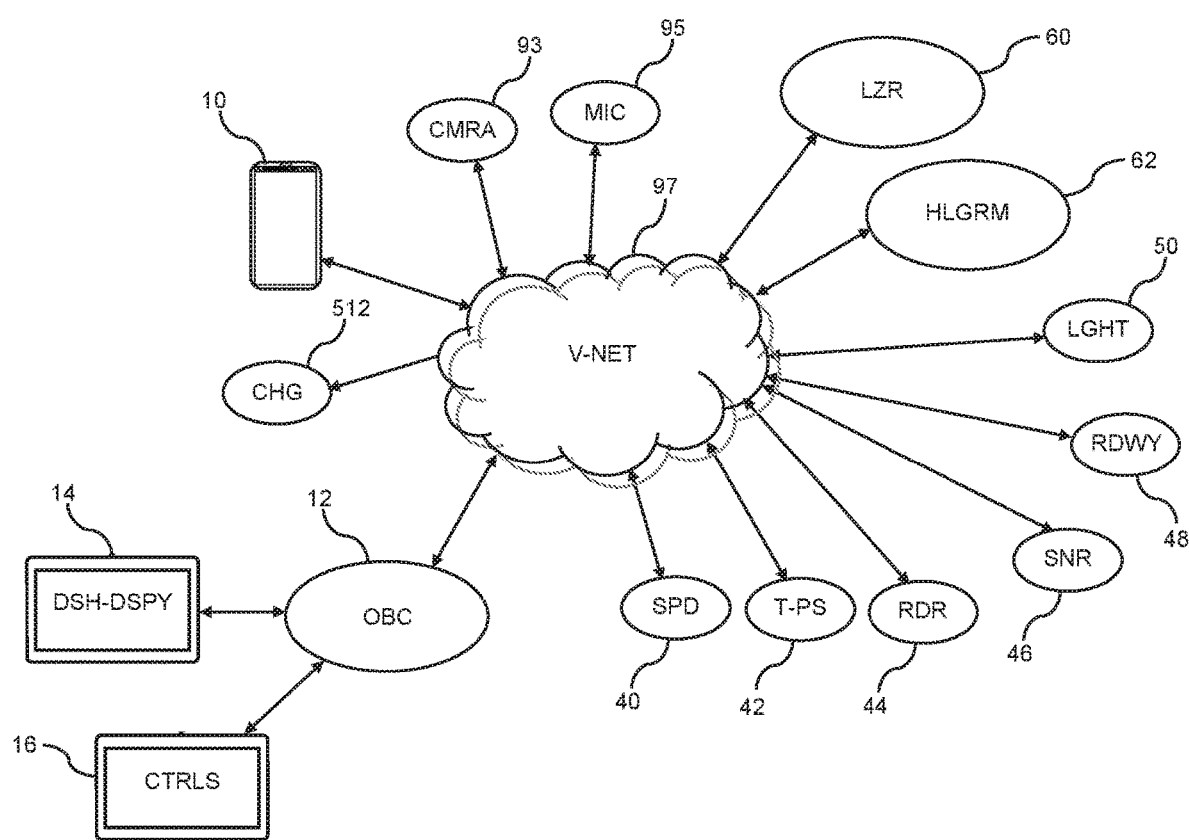
FIG. 8 illustrates a data connection diagram of the system for detecting collisions.

Referring to FIG. 8, a data connection diagram of the exemplary system for avoiding accidents is shown. In this example, an on-board computer 12 (or any computing entity), communicates through a vehicle network 97 (e.g. car-area network or CAN, vehicle-area network or VAN, etc.) to various entities, some or all of which are included of the exemplary system for avoiding accidents.

As will be shown, the on-board computer 12 communicates with various input devices or sensors to obtain information regarding the speed of the vehicle, vehicle conditions, road conditions/weather, surrounding vehicles, etc. In this example, the input devices or sensors include, but are not limited to, a speed sensor 40, one or more tire pressure sensors 42, a radar system 44 (e.g. for sensing positions and speeds of other vehicles), a sonar system 46 (e.g. also for sensing positions and speeds of other vehicles, a roadway condition sensor 48 (e.g. for sensing the type of roadway and/or road conditions such as wet, dry, snow-covered, ice-covered, an ambient light sensor 50 (e.g. for determining ambient light), one or more cameras 93 (e.g. for sensing objects, other vehicles, etc.), and a microphone 95 (e.g. for measuring road noise to determine type of road surface). The on-board computer 12 also communicates with projecting devices 60/62. The projecting devices 60/62, under control of the on-board computer 12, project an image either onto the roadway (e.g. a laser projecting device) or into the space above the roadway (e.g. a holographic projecting device 62). It is anticipated that either or both of the projecting devices 60/62 are used in any embodiment of this invention.

For completeness, the vehicle network 97 (or the on-board computer 12) communicates with external devices 10 (e.g. a cellular phone or a maintenance computer) either by direct connection through a service connector (not shown, but known in the industry) or through a wireless interface such as Bluetooth through a Bluetooth radio transceiver 94 (see FIG. 2) or Wi-Fi through a Wi-Fi radio transceiver 96 (see FIG. 2).

In a preferred embodiment, the on-board computer 12 interfaces to a dashboard display 14 (e.g., gauges, illuminating icons, graphics display, etc.) for displaying various information and to one or more controls 16 (e.g. accelerator, brakes, switchers).

In some embodiments, a wide-area transceiver 17 is included for communicating with external systems through, for example, the cellular network. When present, the wide-area transceiver 17 is capable of transmitting location information from the positioning system 91 to a remote location, automatically, in the event of an accident. In some embodiments, the wide-area transceiver 17 operates on a dedicated wide-area network or on a public wide-area network such as communicating with cell towers in a cellular network.

In some embodiments, an accelerometer 51 is included to measure vehicle acceleration and deceleration (negative acceleration). The accelerometer 51, when present, will be used, for example, to determine if a collision has occurred, for example when a reading from the accelerometer 51 exceeds 1.1 g.

Figure 9A:
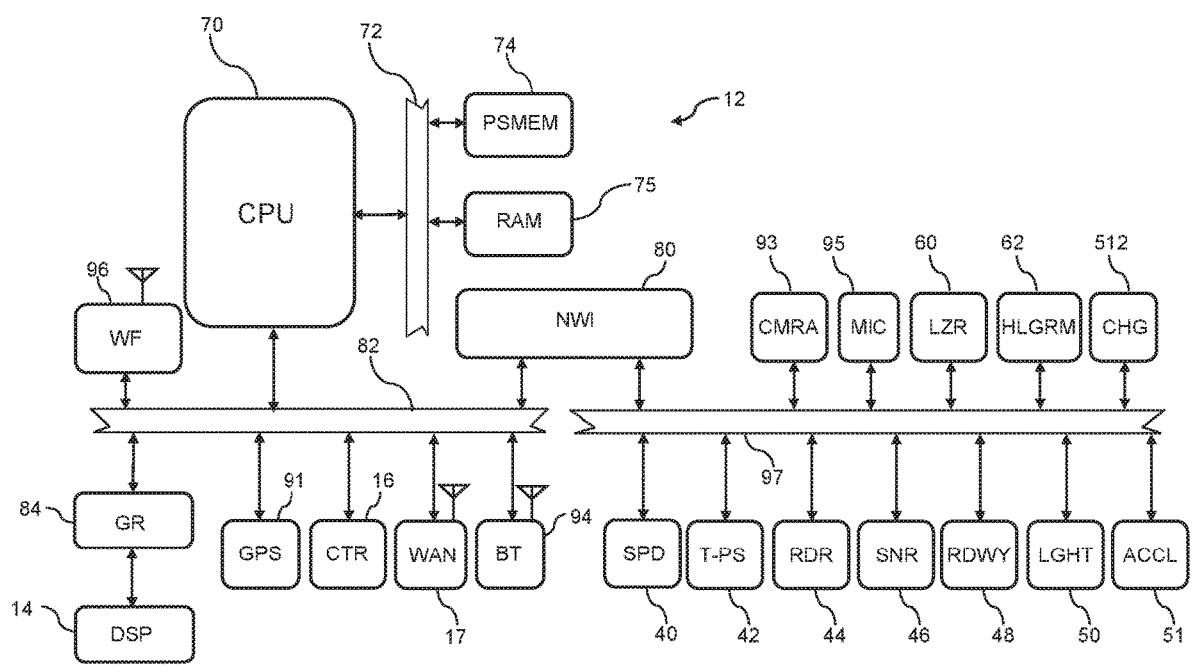
FIG. 9A illustrates a schematic view of the system for detecting collisions.

Referring to FIG. 9A, a schematic view of a typical computing system of the exemplary system for detecting collisions is shown. Although any computing entity is anticipated, for clarity purposes, an on-board computer 12 is shown.

The exemplary system for detecting collisions is described using a processor-based on-board computer 12 that also provides standard vehicle-wide operation as known in existing vehicles. The present invention is in no way limited to using the on-board computer 12 to perform calculations, measure data, and/or calculate image projections, as any computing entity is anticipated. The on-board computer 12 is shown as one way of implementing the present application utilizing existing computational power within the vehicle. It is fully anticipated that different architectures are known that accomplish similar results in a similar fashion and the present invention is not limited in any way to any particular vehicular architecture or implementation.

In this example, a processor 70 executes or runs programs in a random-access memory 75. The programs are generally stored within a persistent memory 74 and loaded into the random-access memory 75 when needed. The processor 70 is any processor, typically a processor designed for vehicles. The persistent memory 74 and random-access memory 75 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary on-board computers 12, the persistent memory 74 is removable, in the form of a memory card of appropriate format such as SD (secure digital) cards, micro SD cards, compact flash, etc.

Also, connected to the processor 70 is a system bus 82 for connecting to peripheral subsystems such as a graphics adapter 84 and an input interface to various controls 16. The graphics adapter 84 receives commands from the processor 70 and controls what is depicted on the dashboard display 14. The controls 16 provide navigation and selection of vehicle features (e.g. turn signals, audio controls, horn, etc.).

In general, some portion of the persistent memory 74 is used to store programs, executable code, and data, etc. It is anticipated that the data includes one or more specification parameters regarding the vehicle such as weight, stopping distance, acceleration parameters, length, width, tire tread data, tire tread wear predictions, etc. In some embodiments, this data is used to determine the safety zone around the vehicle. In some embodiments, other data is stored in the persistent memory 74 such as audio files, video files, text messages, etc.

In some embodiments, positioning system 91 (e.g. a global positioning or GPS system) is interface to the system bus 82. In some embodiments, the exemplary system for detecting collisions utilizes data from the positioning system 91 to determine speed/velocity of the vehicle, time-of-day, road type, etc.

In many embodiments of the present invention, a Bluetooth radio transceiver 94 and/or a Wi-Fi radio transceiver 96 are included for communicating with other devices or with peripherals/sensors that are interfaced to the vehicle.

As known in the industry, many vehicles utilize a vehicle network 97 (e.g. car-area network or CAN, vehicle-area network or VAN, etc.) for communicating with various entities, some or all of which are included of the exemplary system for avoiding accidents. In this example, a vehicle network interface 80 interfaces between the system bus 82 and the vehicle network 97 (e.g. car-area network or CAN, vehicle-area network or VAN, etc.).

In this example, the input devices or sensors include, but are not limited to, a speed sensor 40, one or more tire pressure sensors 42, a radar system 44 (e.g. for sensing positions and speeds of other vehicles), a sonar system 46 (e.g. also for sensing positions and speeds of other vehicles), a roadway condition sensor 48 (e.g. for sensing the type of roadway and/or moisture on the roadway), an ambient light sensor 50 (e.g. for determining ambient light, daytime, night, dawn, dusk), one or more cameras 93 (e.g. for sensing objects, other vehicles, etc.), and one or more microphones 95 (e.g. for measuring road noise to determine type of road surface). The on-board computer 12 also communicates through the vehicle network 97 with projecting devices 60/62 for projecting an image either onto the roadway (e.g. a roadway projecting device 60) or into the space above the roadway (e.g. a holographic projecting device 62). It is anticipated that either or both of the projecting devices 60/62 are used in any embodiment of this invention.

Figure 9B:
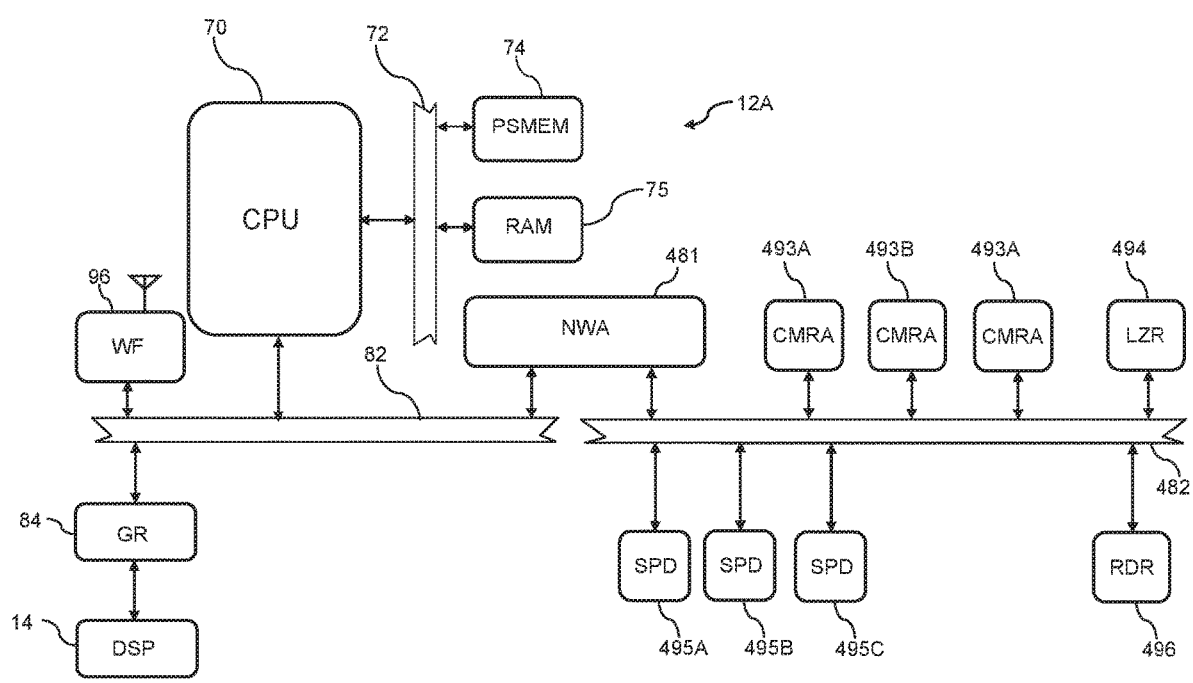
FIG. 9B illustrates a schematic view of the system for detecting collisions.

Referring to FIG. 9B, a schematic view of a typical municipal computing system of the exemplary system for detecting collisions is shown. Although any computing entity is anticipated, for clarity purposes, a general-purpose computer 12A is shown.

The exemplary system for detecting collisions is described using a computer 12A for providing standard municipal monitoring including, but not limited to, for example, gathering roadway performance data (average vehicle speed, congestion, etc.). The computer 12A is used to switch images on displays, to perform calculations, measure data, and/or calculate probable collisions per the present application. The computer 12A is shown as one way of implementing the present application utilizing existing computational power within the vehicle. It is fully anticipated that different architectures are known that accomplish similar results in a similar fashion and the present invention is not limited in any way to any particular vehicular architecture or implementation.

In this example, a processor 70 executes or runs programs in a random-access memory 75. The programs are generally stored within a persistent memory 74 and loaded into the random-access memory 75 when needed. The processor 70 is any processor, typically a processor designed for vehicles. The persistent memory 74 and random-access memory 75 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary on-board computers 12, the persistent memory 74 is removable, in the form of a memory card of appropriate format such as SD (secure digital) cards, micro SD cards, compact flash, etc.

Also, connected to the processor 70 is a system bus 82 for connecting to peripheral subsystems such as a graphics adapter 84 and an input interface to various controls 16. The graphics adapter 84 receives commands from the processor 70 and controls what is depicted on the display 14 (e.g. at a traffic monitoring station).

In general, some portion of the persistent memory 74 is used to store programs, executable code, and data, etc. It is anticipated that the data includes one or more specification parameters regarding the collision detection parameters. In some embodiments, this data is used by algorithms for detecting collisions; other data is also stored in the persistent memory 74 such as audio files, video files, text messages, etc.

In many embodiments of the present invention, a Wi-Fi radio transceiver 96 is included for communicating with other devices, for example, for alerting of a collision that was just detected.

As known in the industry, there are many mechanisms for communicating camera and sensor data to the processor 70. In this exemplary embodiment, a network interface adapter 80 interfaces between the system bus 82 and a local area network 482 (e.g. Ethernet).

In this example, the input devices or sensors include, but are not limited to, in-road speed sensors 495A/495B/495C, one or more radar speed monitoring systems 496 (e.g. for sensing positions and speeds of vehicles on the road being monitored), one or more cameras 495A/495B/495C (e.g. for sensing vehicle accelerations and decelerations, etc.), one or more laser speed monitoring systems 494 (e.g. for sensing positions and speeds of vehicles on the road being monitored). Although specific numbers of each sensor/camera are shown, any number (including zero) is anticipated. The in-road speed sensors 495A/495B/495C are, for example, spaced apart magnetic mass detectors as used currently for traffic monitoring. As vehicles pass over the in-road speed sensors 495A/495B/495C, a signal is generated, so that, monitoring subsequent in-road speed sensors 495A/495B/

495C enables measuring of the speed of a vehicle passing over such in-road speed sensors 495A/495B/495C.

Figure 10A:
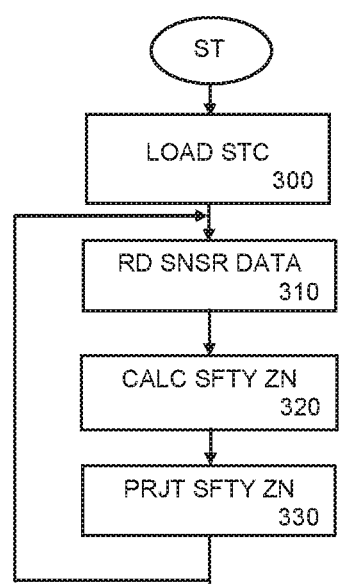
FIG. 10A illustrates a first flow chart of the system for detecting collisions.
Figure 10B:
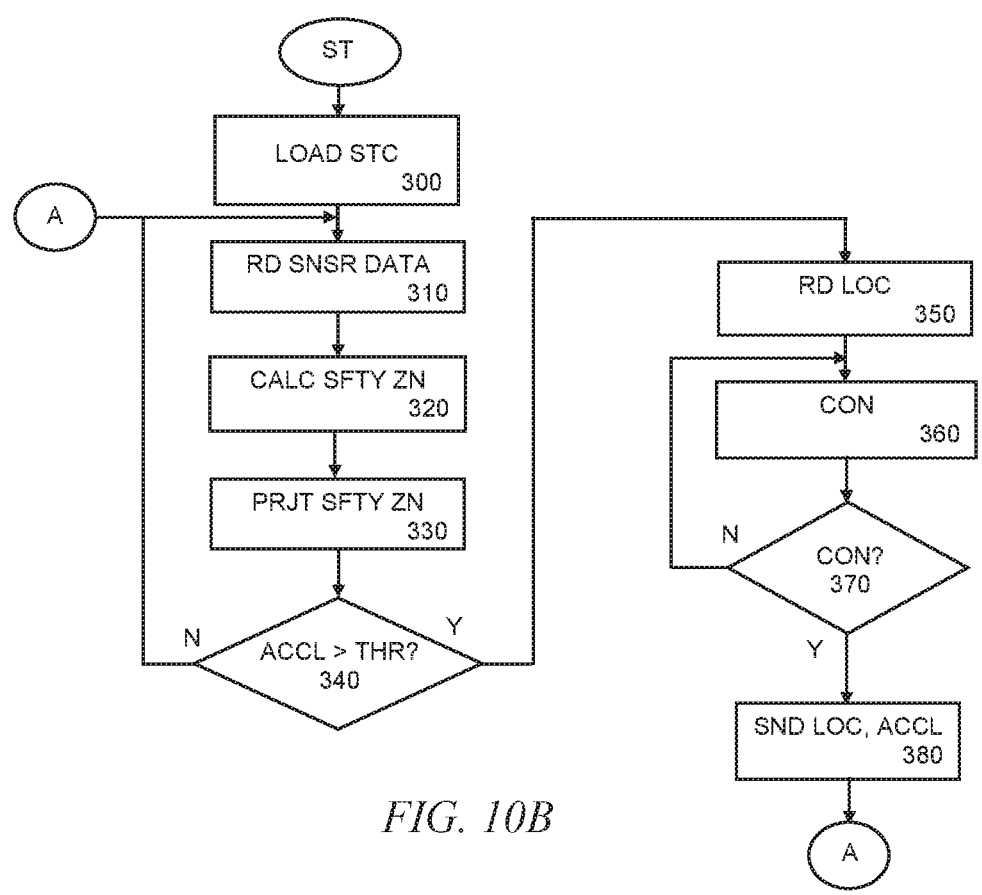
FIG. 10B illustrates a second flow chart of the system for detecting collisions.

Referring to FIGS. 10A and 10B exemplary flow charts of the system for detecting collisions are shown. In both examples, software running on the processor 70 reads 300 static data such as the vehicle weight, vehicle braking power, vehicle acceleration ability, vehicle dimensions, etc. The static data is typically preprogrammed and stored in persistent memory 74. The software then enters a loop. Each time through the loop, the software reads 310 sensor data from one or of the sensors, for example, the speed sensor 40, one or more tire pressure sensors 42, the radar system 44 (e.g. for sensing positions and speeds of other vehicles), the sonar system 46 (e.g. also for sensing positions and speeds of other vehicles, the roadway condition sensor 48 (e.g. for sensing the type of roadway and/or moisture on the roadway), the ambient light sensor 50 (e.g. for determining ambient light), one or more cameras 93 (e.g. for sensing objects, other vehicles, etc.), and/or the microphone 95 (e.g. for measuring road noise to determine type of road surface). From the stored data and the sensor data, the software calculates 320 each of the safety zones (e.g. the safe inter-vehicle distance) and then projects 330 the safety zones, for example in front and behind the index vehicle 5.

In FIG. 10B, an additional test 340 is performed to determine if the acceleration (or deceleration) is greater than a predetermined threshold (e.g. greater than 1.1 gravitational forces). Note that it is anticipated that there be different thresholds for each directional axis of the index vehicle 5. For example, one threshold for acceleration, another threshold for deceleration, and still another for sideways acceleration in either direction. If the test 340 determines that the acceleration (or deceleration) is not greater than a predetermined threshold, the loop continues. If the test 340 determines that the acceleration (or deceleration) is greater than a predetermined threshold, a notification step is initiated. Although there are many ways anticipated to notify, in the example shown, the software reads 350 the location of the index vehicle 5 (e.g. from the positioning system 91) then initiates a connection 360 to a remote system. A test 370 is made to determine if the connection succeeded. If the test 370 determines that the connection failed, the initiation of the connection 360 is repeated until the test 370 determines that the connection succeeded, after which data is sent 380 to the remote system. The data that is sent 380 includes, for example, an identification of the vehicle, the location, the peak measured acceleration or deceleration, the time, other conditions as read by the sensors, etc. The remote system, upon receiving the data, reviews the data to determine what type of response needs to be made. For example, if the acceleration or deceleration is very high, an ambulance or life-flight is dispatched. If the acceleration or deceleration is low, an officer is dispatched, etc.

Figure 10C:
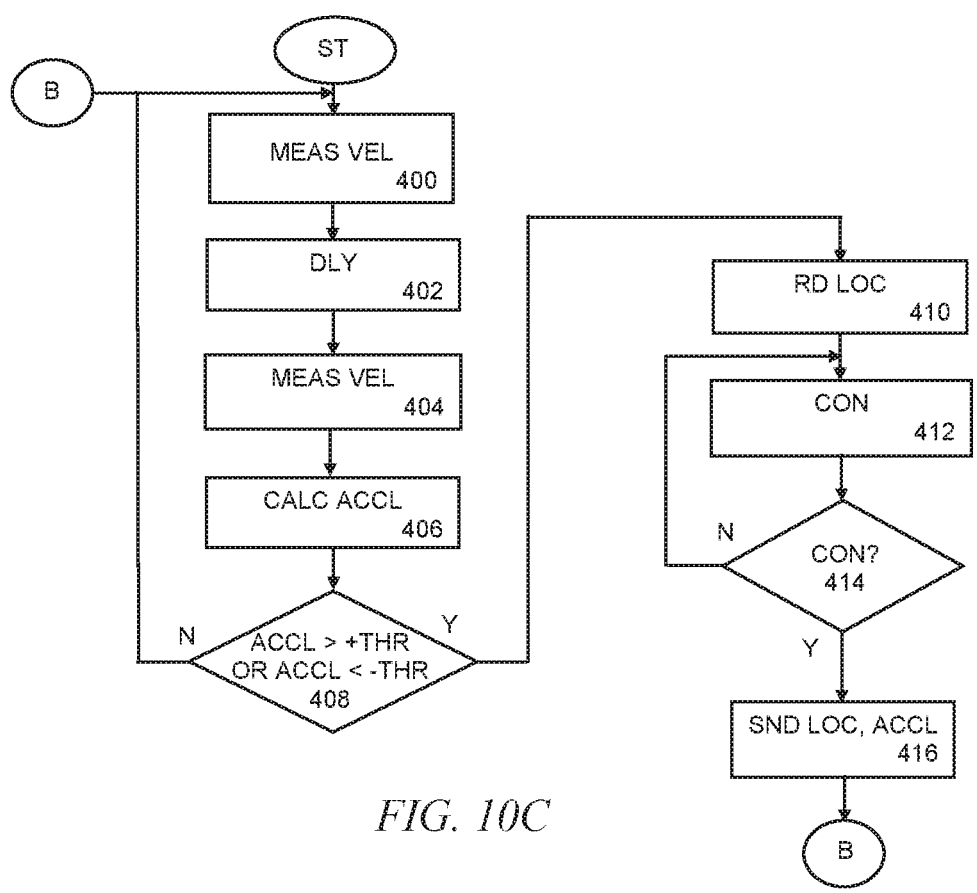
FIG. 10C illustrates a third flow chart of the system for detecting collisions.

FIG. 10C illustrates a third flow chart of the system for detecting collisions. The exemplary algorithm shown in FIG. 10C is anticipated to be performed by an on-board computer 12, an external device 10 (e.g. cellphone), a municipal computer 12A, or any other processor. The algorithm starts by measuring the first velocity (speed) 400 of a vehicle by any mechanism available such as using GPS, using a speed sensor 40, radar 496/laser 494, in-road sensors 495A/495B/495C, etc. Next, a fixed time delay is performed 402, then the new velocity (speed) 404 of the vehicle is measured by any mechanism available. An acceleration value is calculated 406 ((first velocity-second velocity)/fixed time). Note the acceleration is anticipated to be either positive or negative (deceleration). Now a test 408 is performed to determine if the acceleration is greater than a predetermined acceleration threshold or the deceleration is less than a pre-determined deceleration threshold (e.g. an acceleration or deceleration greater than 1.1 gravitational forces). Note that it is anticipated that there be different thresholds for each directional axis of the index vehicle 5. For example, one threshold for acceleration, one threshold for deceleration, and still another threshold for sideways acceleration in either direction. If the test 408 determines that the acceleration (or deceleration) is not greater than the predetermined threshold or less than the pre-determined deceleration threshold, the loop continues (B). If the test 408 determines that the acceleration (or deceleration) is greater than the predetermined threshold or less than the pre-determined deceleration threshold, a notification step is initiated. Although there are many ways anticipated to notify, in the example shown, the software reads 410 the location of the index vehicle 5 from, for example, the positioning system 91 then initiates a connection 412 to a remote system. A test 414 is made to determine if the connection succeeded. If the test 414 determines that the connection failed, the connection 412 is repeated until the test 414 determines that the connection succeeded. After a successful connection, data is sent 416 to the remote system. The data that is sent 416 includes, for example, an identification of the vehicle, the location, the peak measured acceleration or deceleration, the time, other conditions as read by the sensors, etc. The remote system, upon receiving the data, reviews the data to determine what type of response needs to be made. For example, if the acceleration or deceleration is very high, an ambulance or life-flight is dispatched. If the acceleration or deceleration is low, an officer and maybe a tow truck is dispatched, etc.

Figure 10D:
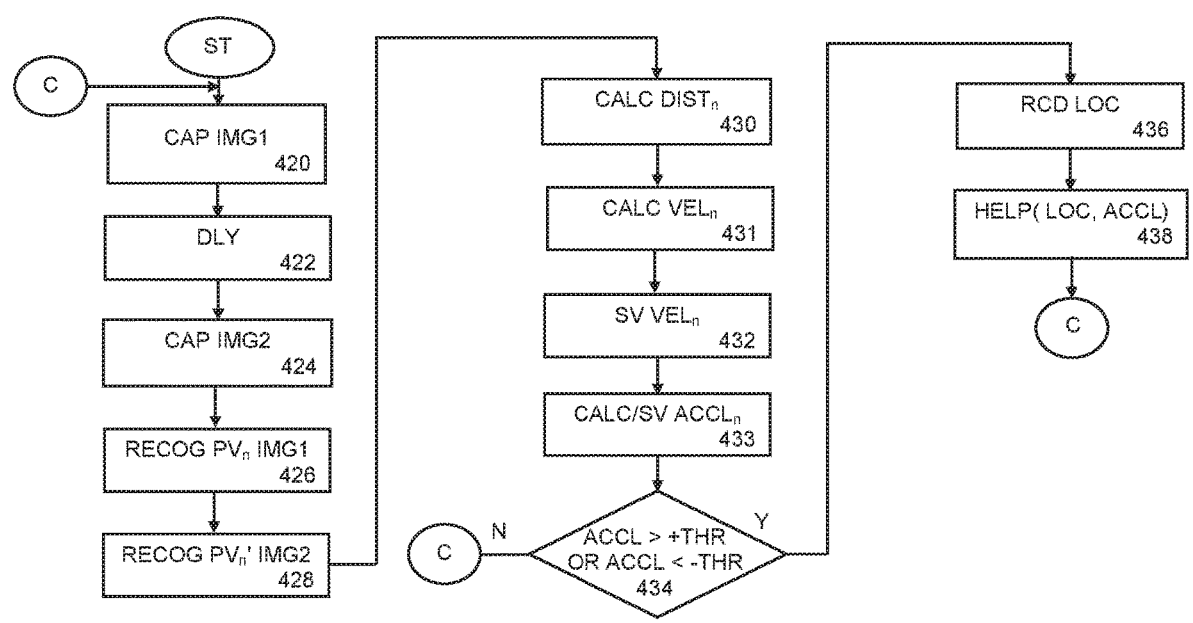
FIG. 10D illustrates a fourth flow chart of the system for detecting collisions.

FIG. 10D illustrates a fourth flow chart of the system for detecting collisions. In some embodiments, the exemplary algorithm shown in FIG. 10D is anticipated to be performed by a municipal computer 12A having one or more cameras 493A/493B/493C directed toward a roadway. The algorithm starts by capturing a first image 420 from one of the cameras 493A/493B/493C (note the same or similar steps are performed for other cameras as well as inter-camera as vehicles will travel in and out of view of each of the cameras 493A/493B/493C. Next, a fixed time delay is performed 422, then a second image 424 is captured from one of the cameras 493A/493B/493C. Recognition algorithms are used to determine the first position 426 of each vehicle ($PV_n$) and then recognition algorithms are used to determine the second position 428 of each vehicle ($PV_n'$). Now a distance traveled ($DIST_n$) is calculated 430 as the difference between the positions of each vehicle before ($PV_n$) and after ($PV_n'$) the fixed delay. The velocity ($VEL_n$) of each vehicle is then calculated 431 (DISTn/fixed delay). The velocity of each vehicle ($VEL_n$) is saved 432 for subsequent loops. Having a previous velocity from the previous pass of the loop, an acceleration is calculated 433 ((prior loop $VEL_n$–current $VEL_n$)/fixed time). Note the acceleration is anticipated to be either positive (acceleration) or negative (deceleration), or even sideways acceleration. Now a test 434 is performed to determine if the acceleration is greater than a predetermined acceleration threshold or the deceleration is less than a pre-determined deceleration threshold (e.g. an acceleration or deceleration greater than 1.1 gravitational forces or a deceleration less than –1.1 gravitational forces). Note that it is anticipated that there be different thresholds for each directional axis of the index vehicle 5. For example, one threshold for acceleration, one threshold for deceleration, and still another threshold for sideways acceleration in either direction. If the test 434 determines that the acceleration (or deceleration) is not greater than the predetermined threshold or less than the pre-determined deceleration threshold, the loop continues (C). If the test 434 determines that the acceleration (or deceleration) is greater than the predetermined threshold or less than the pre-determined deceleration threshold, a notification step is initiated. In the example shown, the software records the location of the vehicle from, for example, the specific camera 493A/493B/493C. Help is then summoned 438, providing the location and severity (e.g. >1.1 g, >5 g, >10 g) to an operator such as a 911 operator or another municipal employee. The person receiving the help request reviews the data (and optionally the cameras 493A/493B/493C) to determine what type of response needs to be made. For example, if the acceleration or deceleration is very high, an ambulance or life-flight is dispatched. If the acceleration or deceleration is low, an officer and maybe a tow truck is dispatched, etc. Note that similar functions are applied to other ways to obtain velocity data such as speed sensors 495A/495B/495C, radar 496 aimed at the roadway (e.g. radar 496 in speed warning signs), laser speed detectors 494, etc.

Figure 11:
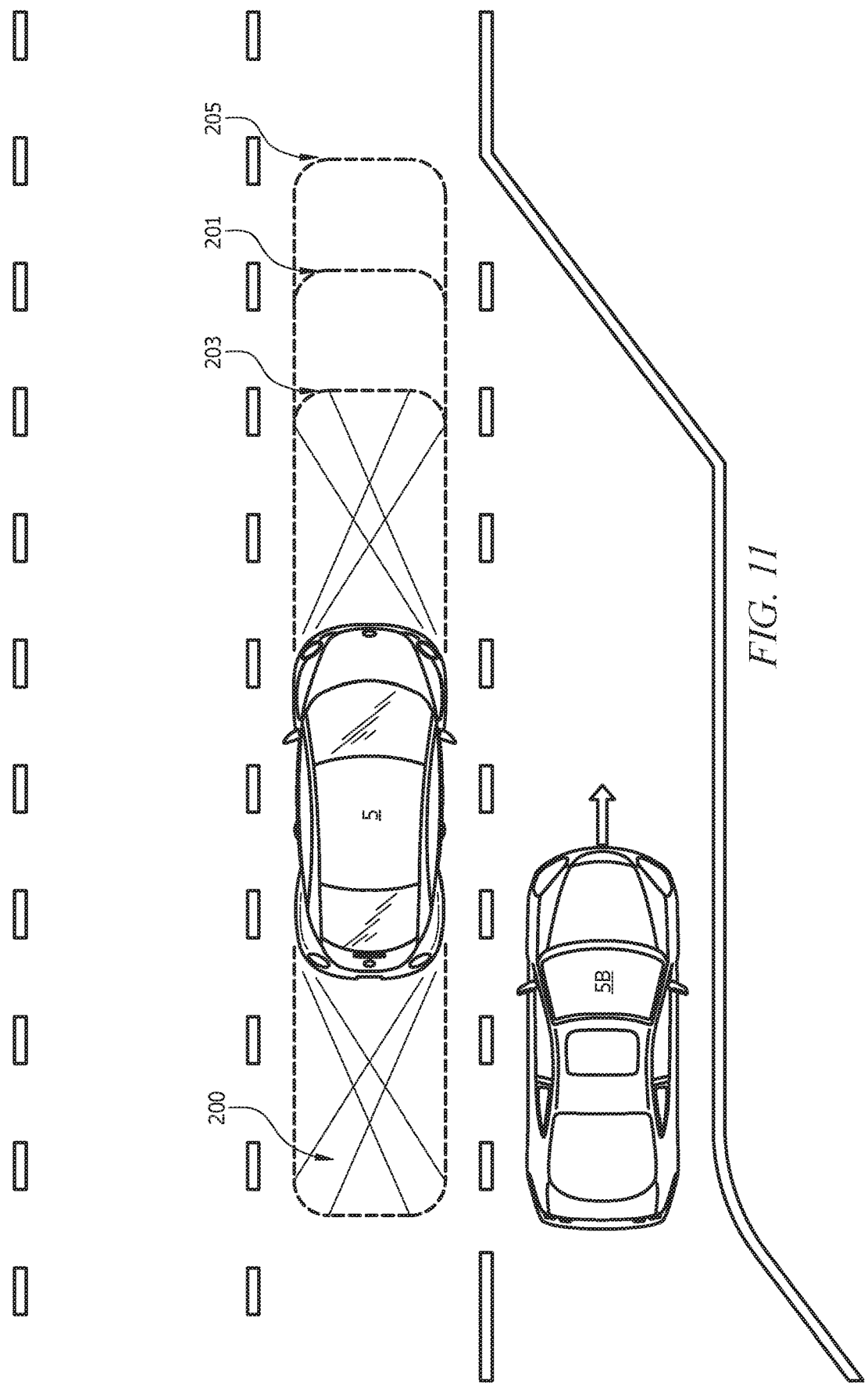
FIG. 11 illustrates a sixth schematic view of a vehicle with illumination zones of the system for avoiding accidents.

FIG. 11 illustrates a sixth schematic view of a vehicle with illumination zones of the system for avoiding accidents. In this example, the index vehicle 5 is traveling in the rightmost lane of a highway having an entrance ramp and another vehicle 5B is entering the highway on an entrance ramp. As many drivers know, it is always a complex decision process when a vehicle enters the roadway on an entrance ramp. Often, the other vehicle 5B that is entering the highway tries to speed up to the average speed of the highway (e.g. the speed at which the index vehicle 5 is traveling). Seeing the other vehicle 5B entering the highway, the driver of the index vehicle 5 often does one of three things: maintains speed, increases speed, or slows down. Not knowing what the driver of the index vehicle 5 will do, the other vehicle will do one of three things: speed up to try and enter in front of the index vehicle, slow down to try and enter behind the index vehicle 5, or maintain speed thinking the index vehicle 5 will yield or change lanes.

Having the ability to project an image, the index vehicle 5 projects an image of a safety zone 201/202/205 on the roadway in front of the index vehicle 5. This shows the other vehicle 5B two things: a location at which it is safe to enter the highway in front of the index vehicle, and whether the index vehicle is increasing or decreasing speed. For example, if the index vehicle 5 increases speed, the safety zone size increases from 201 to 205, indicating to the other vehicle 5*b* that the other vehicle 5*b* needs to slow down and enter behind the index vehicle 5. If the index vehicle 5 decreases speed, the safety zone size decreases from 201 to 203, indicating to the other vehicle 5*b* that the other vehicle 5*b* is able to enter in front of the index vehicle 5, preferably in front of the, now smaller, safety zone 203.

A similar rear safety zone 200 is projected behind the index vehicle 5 to show the other vehicle 5B where to enter the highway at a safe distance behind the index vehicle 5.

Figure 12:
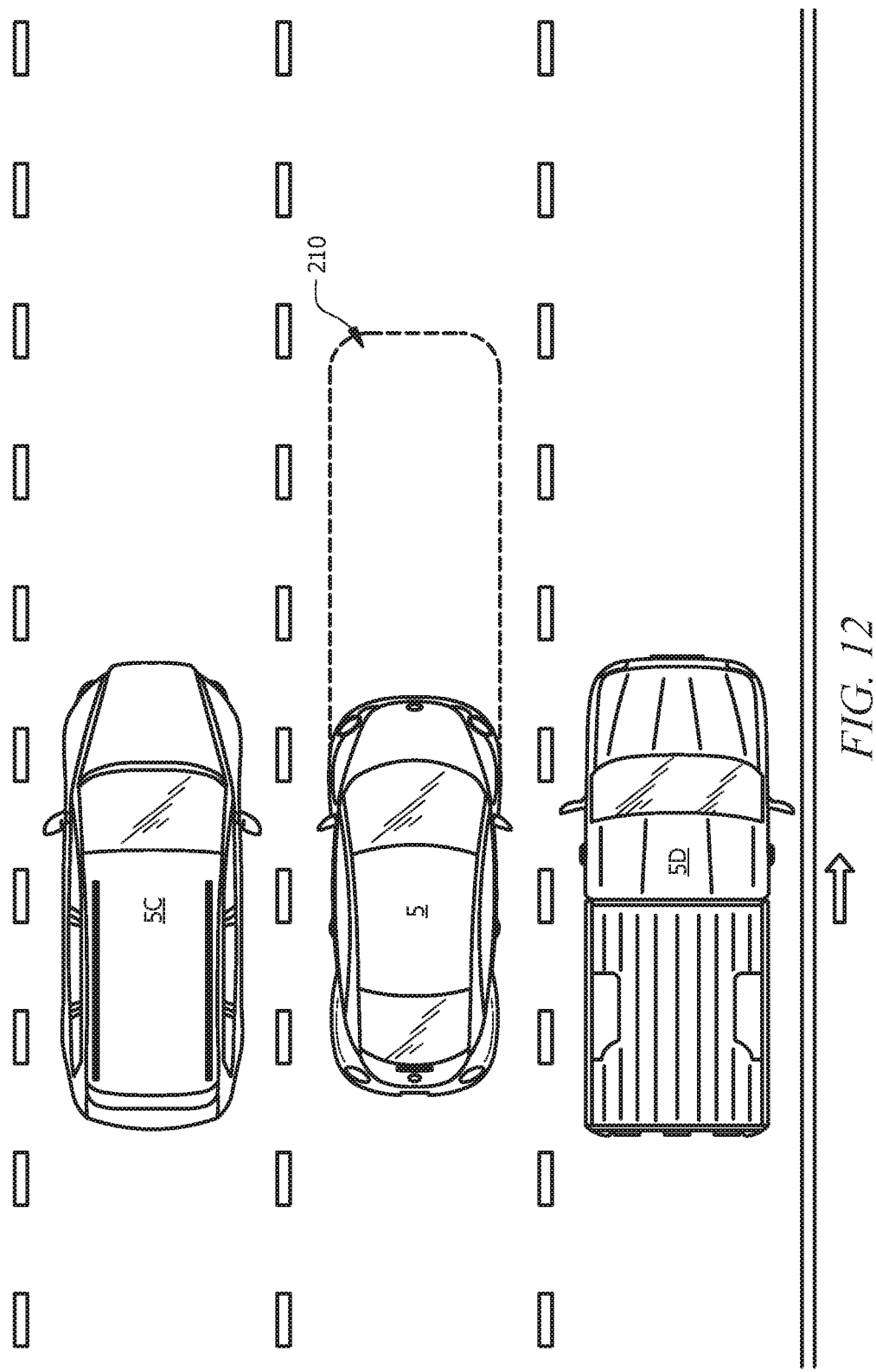
FIG. 12 illustrates a seventh schematic view of a vehicle with illumination zones of the system for avoiding accidents.

FIG. 12 illustrates a seventh schematic view of a vehicle with illumination safety zones 210 of the system for avoiding accidents. As vehicles 5/5C/5D travel on multi-lane roads, often other vehicles 5C/5D desire to change lanes in front of the index vehicle 5. In such, there is no leading/trailing vehicle relationship, but there are relative speeds of each other vehicle 5C/5D with respect to the index vehicle 5. In this, the forward safety zone 210 projects an area in front of the index vehicle 5 in which is it not safe to enter when changing lanes, based upon the speed of each vehicle 5/5C/5D. For example, if the other vehicle 5D is traveling much faster than the index vehicle 5, then the forward safety zone 210 is projected closer to the index vehicle (smaller forward safety zone 210) as it would be difficult for the index vehicle 5 to catch up to the speeding other vehicle 5D, but if the other vehicle 5D is only traveling slightly faster than the index vehicle, then a larger safety zone 210 is projected as the index vehicle 5 is in danger if the other vehicle 5D enters the same lane too close to the index vehicle 5.

Figure 13:
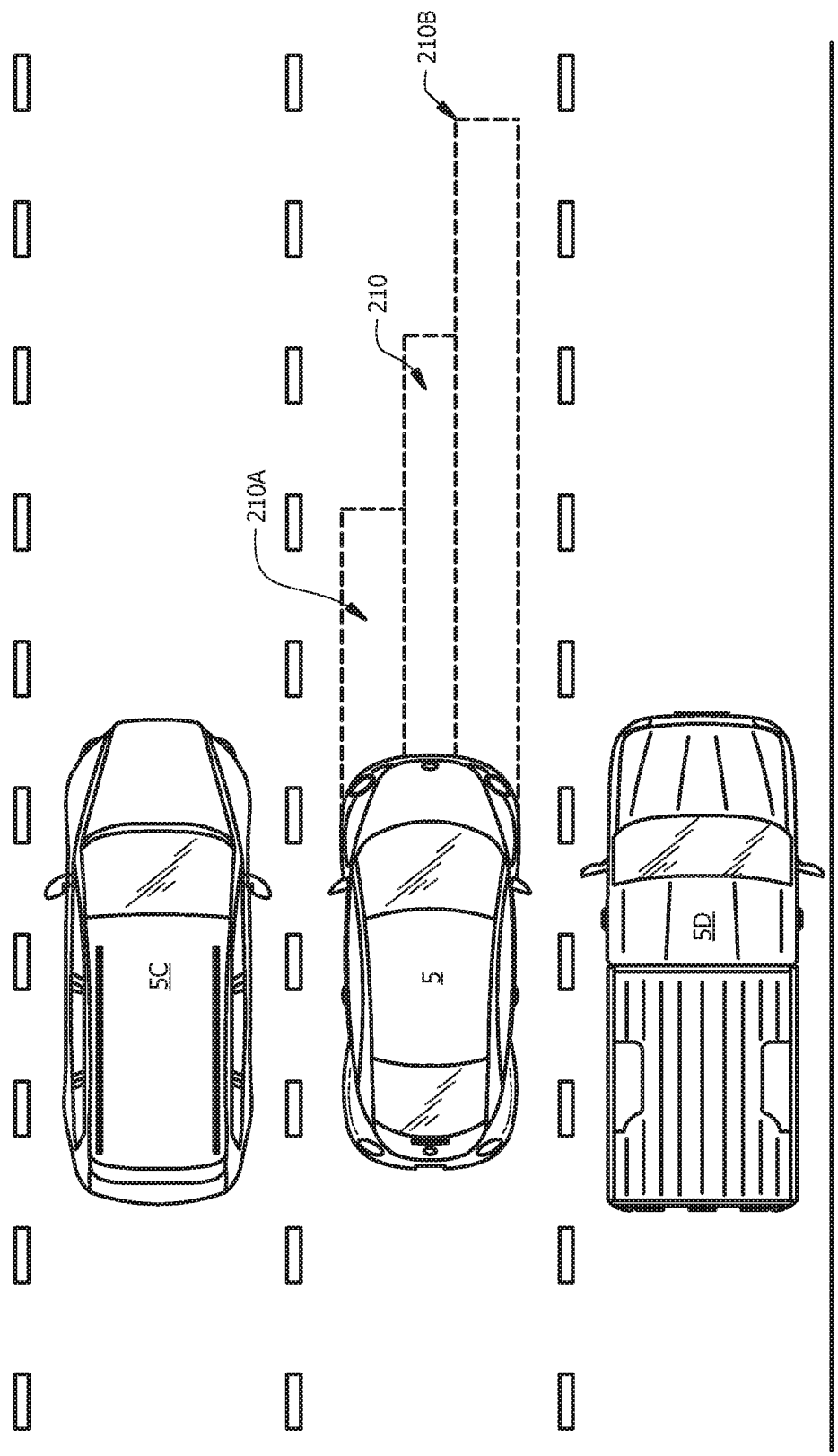
FIG. 13 illustrates an eighth schematic view of a vehicle with illumination zones of the system for avoiding accidents.

FIG. 13 illustrates an eighth schematic view of an index vehicle 5 with safety zones 201/201A/210B of the system for avoiding accidents. In this example, the safety zones 201/201A/210B is projected in three segments. A first safety zone segment 201A indicates to a driver of another vehicle 5C approaching on the left side of the index vehicle 5 where it would not be safe to enter into the lane of the index vehicle 5. A second safety zone segment 201C indicates to a driver of another vehicle 5D approaching on the right side of the index vehicle 5 where it would not be safe to enter into the lane of the index vehicle 5. Note that the safe entry point for each other vehicle 5C/5D depends upon the relative speed of the other vehicle 5C/5D compared with that of the index vehicle 5. For example, if the other vehicle 5C/5D is traveling much faster than the index vehicle 5, the safety zone on that side will be smaller and if the other vehicle 5C/5D is traveling slightly faster than the index vehicle 5, the safety zone on that side will be longer.

A third safety zone 210 indicates the general safety zone as per the prior examples.

Figure 14:
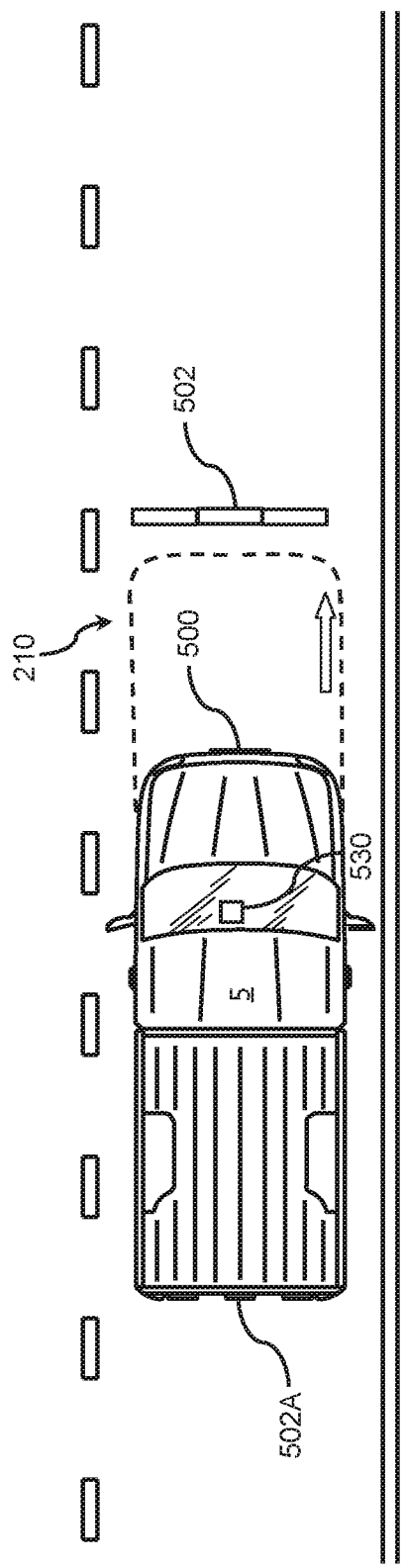
FIG. 14 illustrates a schematic view of a vehicle with illumination zones of the system for avoiding accidents nearing an object.
Figure 15:
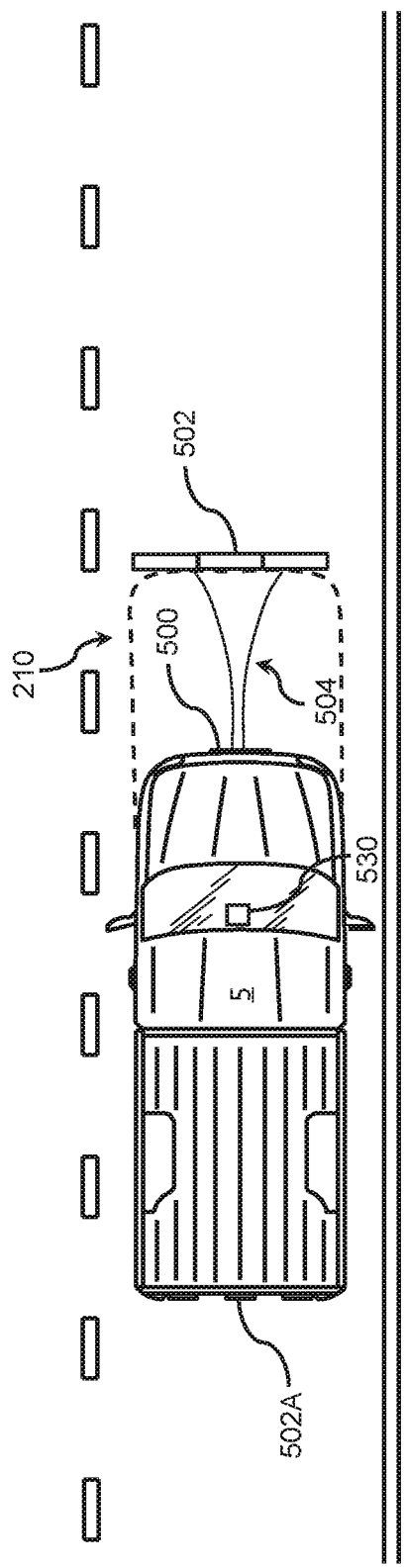
FIG. 15 illustrates a schematic view of a vehicle with illumination zones of the system for avoiding accidents on track to collide with the object.

Referring to FIGS. 14 and 15, schematic views of an index vehicle 5X with illumination zones 210 of the system for avoiding accidents nearing an object 502 in FIG. 14 and on target for a collision with the object 502 in FIG. 15. In FIG. 14, the index vehicle 5X is approaching an object 502 (e.g. a fixed object, another vehicle . . . ). The computer 12 reads various sensors to determine the speed of the index vehicle 5X, the speed of the object 502 (in this example, the object 520 is stationary), road conditions, weather, etc. The computer 12 uses data from the sensors to determine if the index vehicle 5X is on target for a collision with the object 502 as in FIG. 15. As with the prior art, the computer 12 initiates braking to attempt to slow/stop the index vehicle 5X before the index vehicle makes contact with the object 502 (e.g. collides with the object 502). The computer 12 also determines if standard braking is sufficient to prevent a collision with the object 502 and, if not, the computer 12 initiates one or more propulsion devices 500 to emit a jet of liquid 504 (e.g. water or any liquid) to further slow/stop the index vehicle as shown in FIG. 15.

Note that, in some embodiments, circuitry (e.g. processor, sensors, projection devices) for predicting when the index vehicle 5X is on target for a collision with an object 502 are self-contained in a module 530 that, in some embodiments, is attached to the windshield or other surface of the index vehicle 5X, either internal to the index vehicle 5X or external to the index vehicle 5X.

Figure 16:
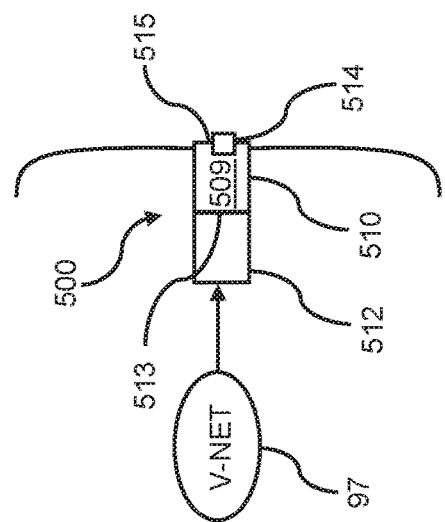
FIGS. 16 and 17 illustrate schematic views of a propulsion device before and after initiating propulsion.
Figure 17:
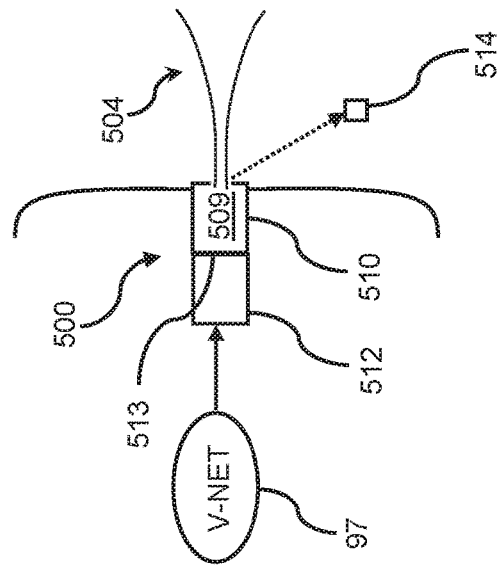

Referring to FIGS. 16 and 17, schematic views of a propulsion device 500 before initiating propulsion in FIG. 16 and after initiating propulsion in FIG. 17. In FIG. 16, the processor 12, through the vehicle network 97 or other computational device determines when the added deceleration from the propulsion device 500 is needed (e.g. when existing braking is not sufficient). When the added deceleration from the propulsion device 500 is needed, the processor 12 initiates an electrical signal to an incendiary device 512 of the propulsion device 500. The incendiary device 512 burns/explodes, creating a very high pressure that pierces or pushes a seal 513 and, therefore, exerts this high pressure upon a liquid 509 (e.g. water or other liquid) that is maintained within a holding tank or reservoir 510, for example, by a plug 514 or membrane. As shown in FIG. 17, the high pressure has forced the plug 514 to exit (or membrane to break) and a jet of liquid 504 exits the propulsion device 500.

Figure 18:
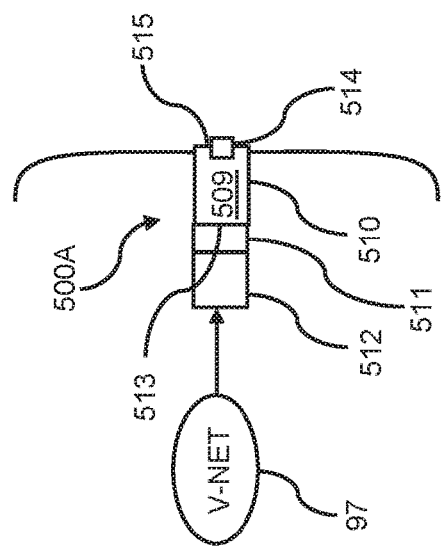
FIGS. 18 and 19 illustrate schematic views of an alternate propulsion device before and after initiating propulsion.
Figure 19:
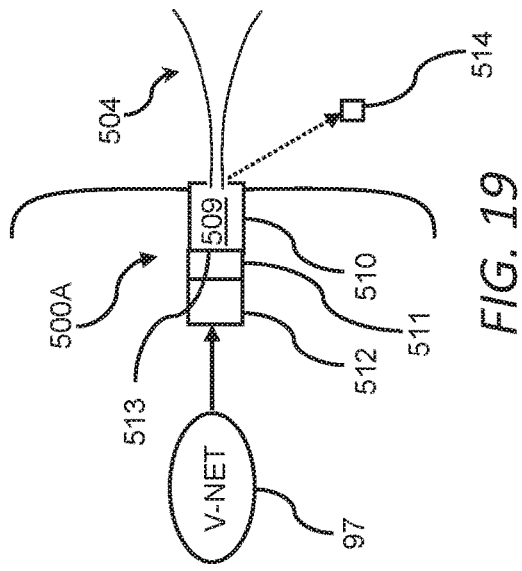

Referring to FIGS. 18 and 19, schematic views of an alternate propulsion device 500A before initiating propulsion in FIG. 18 and after initiating propulsion in FIG. 19. In FIG. 18, the processor 12, through the vehicle network 97 or other computational device determines when the added deceleration from the alternate propulsion device 500A is needed (e.g. when existing braking is not sufficient). When the added deceleration from the alternate propulsion device 500A is needed, the processor 12 initiates an electrical signal to an incendiary device 512 of the alternate propulsion device 500A. The incendiary device 512 burns/explodes within a combustion chamber 511, creating a very high pressure that pierces or pushes a seal 513 and, therefore, exerts this high pressure upon a liquid 509 (e.g. water or other liquid) that is maintained within a holding tank or reservoir 510, for example, by a plug 514 or membrane. As shown in FIG. 19, the high pressure has forced the plug 514 to exit (or membrane to break) and a jet of liquid 504 exits the alternate propulsion device 500A. In Some embodiments, the incendiary device 512 takes about 5 milliseconds to cause propulsion of a jet volume of 1 liter of liquid to the exterior of the vehicle.

The incendiary device 512 includes a cylindrical or other suitable shaped container with a front wall and sidewalls. The incendiary device 512 has a gas generator propellant that, when ignited, creates a volume of gases that pushes the liquid 509 that is stored in the reservoir 510 through an orifice 515 at high speed towards the outside of the vehicle in order to cause deceleration. In some embodiments, the one or more incendiary device 512 consists of an electric conductor wrapped in a combustible material that is activated with current pulse. When the temperature of the conductor rises to a certain point, the combustible material ignites, which generates a large volume of gases. The gases force the liquid 509 out through the orifice 515 under high pressure toward the exterior of the vehicle. In some embodiments, the orifice 515 forms a nozzle or other structure to aim the liquid 509. In some embodiments, the rapid chemical reaction of burning the combustible material generates mostly nitrogen gas, argon or various energetic propellants such as nitro guanidine or ammonium nitrate. In some embodiments, coolants and slag formers such as clay, silica and alumina are anticipated. Multiple propulsion device 500/500A and one or more incendiary device 512 are also anticipated for controlled deceleration and for protection against secondary collisions.

Although shown with a single orifice 515, in some embodiments, multiple orifices or pipes eject the liquid 509 at variable velocities, directions, and volumes; depending on the speed, size and direction of the index vehicle. In some embodiments, multiple orifices or pipes connect to one or more propulsion devices 500/500A surrounding the vehicle, including the front, rear, sides, top and bottom of the vehicle so as to provide for maximum protection at preventing or reducing impact.

Various sensors such as a accelerometer 51, a camera 93, a radar system 44, and/or a sonar system 46 are interfaced to the processor 70 of the computer and algorithms determine when an impending collision between the index vehicle 5X and another vehicle or object 502 is possible. The computer 12 and processor 70 calculate speed and direction using any known method including ultrasound, laser, radar, and/or infra-red. In some embodiments, one or more such sensors telescope mechanically (not shown) at a distance from the body of the index vehicle 5X.

The a jet of liquid 504 produced by the propulsion devices 500/500A is of such a mass, velocity, direction and duration, as to result in deceleration of the target vehicle, maintenance of direction, and/or stabilization of target vehicle position relative to the surrounding structures.

The computer 12 calculates the time and distance to impact and initiates propulsion of a jet of liquid 504 from one or more propulsion devices 500/500A at a time calculated to allow for safe deceleration. In some embodiments, the jet of liquid 504 is pulsed to cause gradual deceleration, e.g. a jet of liquid 504 every 50 milliseconds It is anticipated that one propulsion device 500/500A be activated without necessarily activating adjacent propulsion devices 500/500A. In some embodiments, multiple simultaneous jets of liquid 504 provide protection against secondary impacts or other scenarios such as turning over of the index vehicle 5X, falling into a ditch or a creek, etc. After activation of one or more propulsion devices 500/500A, the index vehicle 5X will decelerate, thus minimizing the force of any impact on the target vehicle 5X and occupants.

According to Newton's third law of motion, the "rebound" force resulting from deployment of a jet of liquid 504 in a direction against movement of the index vehicle 5X causes deceleration of the index vehicle 5X. The force of rebound must be borne by the frame or supporting structures of the target vehicle 5X in order to avoid damage caused by the force of deceleration. If the frame or supporting structures are deep inside the vehicle, then appropriate conduits are included to withstand the force of the jet of liquid 504 and to transmit the force to properly to the index vehicle 5X.

In some embodiments, when the computer 12 determines a collision is imminent, the computer 12 saves and stores images that are being continuously filmed by the camera(s) 93 for a period of time surrounding the imminent collision. In such, documentation of events surrounding a collision by audio and video recording will be available for later retrieval and analysis.

It is anticipated that the disclosed propulsion devices 500/500A provide for deceleration of any type of vehicle, including, but not limited to helicopters, hovercraft, motorcycles, and snowmobiles.

Newton's second law states "Force is equal to the change in momentum (mV) per change in time. For a constant mass, force (F) equals mass times acceleration. Deceleration is the reverse of acceleration and is based on the Newton laws of physics. Thus $d=1/2\ t\ (Vf-Vi)$, where d is distance from initial velocity (Vi) to final velocity (Vf), and the time it takes (t) between these 2 points. F (average force in Newtons)×distance$=-1/2\ mV^2$. Deceleration is measured in meters per second per second, where 1 g is 9.81 m/s/s, and 15 g's is 147 m/s/s. 1 kg mass is 9.81 Newtons. 1 Newton is 0.2248089 pounds, or 0.10197 kg.

For a vehicle weighing 3,200 pounds (14,230 N) traveling at 30 mph, the work required to stop the vehicle in 1 foot is approximately 96,800 feet. lbs., or 48 tons, 16 tons in 3 feet, 8 tons in 6 feet, and 5 tons in 9 feet. At 30 mph (44 ft/sec), the human manual braking deceleration distance is 43 feet (plus perception reaction distance).

The momentum (P) of a vehicle weighing 1,000 kg traveling at 60 mph (26.82 m/s) is 26,822 kgm/s (Table 1). Assume 28 propulsion devices 500/500A are deployed sequentially, at intervals of 10 msec (0.01 sec), each propulsion device 500/500A ejecting 1.0 liter (1.0 kg) (m1) of liquid at a speed of 1000 m/s (v1) against the direction of movement of the vehicle. The momentum (P1) of the jet of liquid 504=m1v1=1 kg×1000 m/s=1,000 kg-m/s. The momentum (P2) on the vehicle=m2v2=1,000 kg×(−1 m/s) =−1,000 kg-m/s. According to Newton's Second law, F1=m1a1, where F1 is force exerted by the jet of liquid 504, m1, is the mass of 1 liter of liquid or water (1 kg), a1 is acceleration of the jet of liquid 504. F2=m2a2, where F2 is force exerted on the vehicle, vehicle mass m2 (1000 kg), and a2 is vehicle deceleration. Newton's Third law states that for every action, there is an equal and opposite reaction: F1=F2. By substituting, m1a1=m2a2. Also, velocity of the jet of liquid 504, v1=a1t, where v1 is the velocity of jet of liquid 504 at 1,000 m/s, a, is acceleration of the jet of liquid 504, and t is time in seconds; v2=a2t, where v2 is velocity of vehicle, a2 is vehicle deceleration, and t is time in seconds. Therefore v2/v1=a2/a1. M1/m2=a2/a1, and m1/m2=v2/v1. Table 1 shows the velocity of the vehicle during each 10 milliseconds time interval, during which 1 liter of liquid is sequentially ejected at each interval, and the corresponding distance traveled by the vehicle until it stops, or reaches the impact object. Thus, v2=v1(m1/m2)=1,000×(1/1000)=1 m/s, which is velocity of "recoil" exerted by the 1 kg water jet on the 1,000 kg vehicle, according to Newton's Third law. The velocity of the vehicle is reduced by 1 m/s, every 10 milliseconds, resulting in a deceleration force of 1.0 m/s/0.01 s=100 m/s^2, or 100/9.81=10.2 g's. The total distance needed for "safe" deceleration (10.2 g's) is about 3.7 meters for a vehicle weighing 1,000 kg traveling at a velocity of 60 mph, or 26.8 m/s, and the total time of liquid deployment is about 270 milliseconds. The total volume of liquid used is 28 liters. In contrast, for an exterior airbag system to provide the same rate of deceleration, an airbag with an internal diameter of 3.7 meters is deployed, that needs to be fully inflated to a volume of 27 cubic meters, or 26,965 liters, assuming spherical shape, (3.7/2)^3×4/3×22/7. Since it takes about 20 milliseconds to fully inflate a standard 70 liters airbag, it might take 7.7 seconds to fully inflate the exterior airbag, and that the airbag has to start deployment 206 meters before impact for a 1,000 kg vehicle traveling at 60 mph (26.8 m/s). In the example given in Table 1, if a lower rate of deceleration is desired, such as 5.1 g's as may be achieved by race car drivers, then a decrease is made to the velocity of the jets of liquid 504 to 500 m/s, reducing the volume of liquid to 500 milliliters, or increase the time of ejection of the jets of liquid 504 to 20 milliseconds intervals. This will result in doubling of the distance to impact to 7.5 meters, and the total time of jet deployment to 540 milliseconds. On the other hand, if the vehicle was traveling at a speed of 30 mph (13.41 m/s), the vehicle will decelerate at half the distance and time to impact with the same decelerating mass and velocity of the jets of liquid 504.

The force of the propulsion is calculated using Newton's second law of motion which states: Force is equal to mass times acceleration. The concept of an "Impulse" is frequently used in the analysis of collisions and impacts, it equals mass times change in velocity. The limitation of Newton's second law is its application in variable-mass systems such as rocket burning fuel and ejecting spent gases. The correct equation of motion for a body whose mass m decreases with time by ejecting mass "is obtained by applying the second law to the entire constant-mass system consisting of the body and its ejected mass: Force=m times dv/dt, minus u (the velocity of the escaping mass) time dm/dt." This applies only to the vehicle since its mass decreases with every propulsion, and not to the force of the propulsion, whose volume (mass) is constant and predetermined by the microprocessor. However, since the mass of the liquid propulsion is a very small fraction of the mass the vehicle, except when applied to drones, Newton's second and third laws of motion are still adequate approximation. In addition, the calculations regarding deceleration distance to zero motion is more favorable to the index vehicle since it is losing mass as it continues to eject liquid, and therefore less propulsion force is required to decelerate to zero velocity.

Table 1 shows velocity, time and distance before impact for a 1,000 kg vehicle moving at 60 mph (26.8 m/s) decelerating at 1 m/s per 0.01 sec (10.2 g's):

TABLE 1

| Velocity (meter/second) | Time (millisecond) | Cum. Dist. Traveled (meters) |
| --- | --- | --- |
| 26.8 | 10 | 0.27 |
| 22.8 | 50 | 1.24 |
| 17.8 | 100 | 2.23 |
| 12.8 | 150 | 2.97 |
| 7.8 | 200 | 3.46 |
| 2.8 | 250 | 3.7 |
| 0.8 | 270 | 3.73 |

The conservation of momentum states that before liquid jet deployment, total momentum P=P1+P2=0. Energy (E=mv^2/2) is shared: for water jet, E1=1 kg (1,000 m/s)^2/2=500,000 joules, and for the vehicle, E2=1,000 kg (1 m/s)^2/2=500 joules.

In the event of incoming missile or projectile, at speeds of about 500 to 1,500 meters/second, maximum force is needed to cause deceleration or change in direction of the missile or altering the direction of the vehicle to avoid an impact. For example, a 0.5 caliber bullet may travel in air at speeds of 1,000 m/s and hit targets 5,000 meters away, but when it strikes water at a 30-degree angle, it stops within 1 meter. This is due to the drag force of water, which is 1,000 times greater that of air. Other liquids such as molasses have viscosities that are many times more that of water. Thus, a jet of water or other suitable liquid ejected at velocities of 1,000 m/s or more will stop or deflect incoming missiles of similar velocity and mass, according to the above equation: m1/m2=v2/v1, where m1 is the mass of the liquid ejected, v1 is the velocity of the ejected liquid, m2 is the mass of the missile, and v2 is the velocity of the missile.

In the case of drones, propulsion spray or stream when applied to drones, water (liquid) propulsion is a Spray or stream at an angle more than zero from horizontal to avoid striking object or vehicle ahead.

For drones, contra spray or stream 180 degrees from index liquid propulsion to neutralize reaction to the primary propulsion.

For drones, sudden change in direction, speed, altitude is feasible by simultaneous propulsion of same or different magnitude in different directions. It takes 20-60 ms to inflate 60 liters gas in an airbag by an inflator. It takes less than 1 ms to inflate the first liter of gas. A projectile coming out of a nozzle at a speed of 1000 meters per second, travels 1 meter in the first 1 ms. If the projectile is 1 meter away from the index drone the fluid propulsion will deflect the projectile from a distance of 1 meter before the projectile collides with the index drone as well as instantaneously moving the index drone away from the projectile by a distance that depends mainly on the mass of the liquid propulsion and mass of the drone.

For an example, it takes 20 to 60 milliseconds to inflate 60 liters of an interior vehicle airbag by an inflator. Thus, it takes less than one millisecond to inflate the first liter of gas. For liquids, it may take proportionately longer to eject one liter of liquid.

For low mass vehicles such as drones, small quantities of propulsion is effective in 3 ways: first, changing the spatial position of the index drone in a direction opposite to the propulsion jet(s) such as to avoid impact with incoming missile; second, altering the spatial position of an incoming drones by the force of the propulsion jet coming out of the index drone; third, keeping the spatial position of the index drone at the same location by utilizing simultaneous jets of equal force (product of mass times acceleration) at 180 degrees of each other. Since incoming missiles travel at speeds exceeding 1,000 meters per second, deployment of the propulsion jets must start within 5 milliseconds, the time it takes an incendiary device to activate the explosion that leads to liquid propulsion of one liter. Such jet will have the force it takes to stop, slow down or deflect incoming missiles, or other drones. Thus, sudden changes in index drone spatial position, speed and altitude can achieved. Hypothetically, a projectile exiting the nozzle at a speed of 1000 meters per second travels one meter in the first millisecond. If the projectile is 10 meters away from the index drone, the fluid propulsion will deflect the incoming projectile from a distance of less than 10 meters before the projectile collides with the index drone, as well as simultaneously displacing the index drone away from harm way by a distance proportional to the momentum of the liquid propulsion.

In the case of a head-on impending collision, the processor 70, using sensor data, calculates the relative speed of both vehicles and activate the propulsion devices 500/500A to allow time for deceleration. Note that in some embodiments, classic braking is also activated to decelerate the index vehicle 5X.

In some embodiments, the angle of liquid propulsion is greater than zero relative to the horizontal in order to avoid striking an oncoming vehicle.

It is anticipated that the liquid propulsion may be in the shape of a stream or a spray, depending on the situation. For incoming missiles, a spray may cover a larger space to capture multiple fragments or missiles.

In the case of an index vehicle 5X that is stationary, an approaching object will similarly be detected by the processor 70 using sensor data and, if a collision is predicted, the processor 70 will activate one or more propulsion devices 500/500A once the object is determined to have a speed that exceeds a certain pre-set threshold and the object reaches a minimum unsafe distance.

Figure 20:
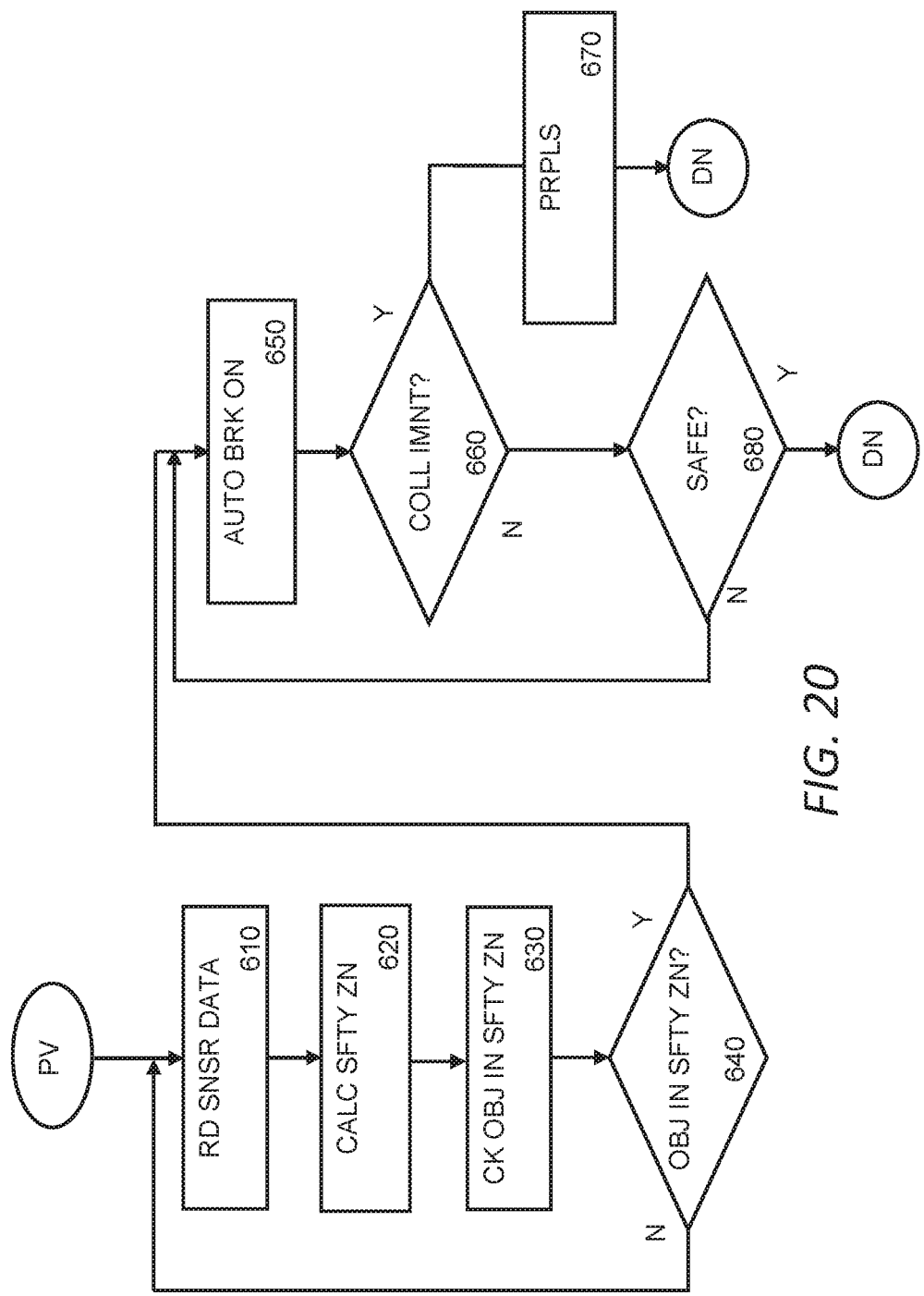
FIG. 20 illustrates a typical program flow of the safety deceleration system.

Referring to FIG. 20 illustrates a typical program flow of the safety deceleration system. This sample flow starts with reading sensor data 610 and calculating a safety zone 620. As described previously, it is anticipated that an image be projected (either flat or holographic) on the roadway in front or behind the index vehicle 5X showing other drivers the safety zone, though such is not required for the safety deceleration system. Next, the sensor data is used to determine 630 if an object (e.g. another vehicle, a stationary object, a projectile, a pedestrian) is within the safety zone. If no object is 640 within the safety zone, the above steps are repeated. Note that, in some embodiments, the object is classified and required to be of a certain size, density, shape, etc., therefore, objects such as areas of fog and insects are ignored.

If an object is 640 within the safety zone, the safety deceleration system initiates automatic braking 650 of the index vehicle 5X as already exists. Now a test 660 is made to determine if a collision is % and, if so, one or more of the propulsion devices 500/500A are activated 670, as needed, to stop the index vehicle 5X. If the test 660 determines that there is no collision imminent, automatic braking 650 continues until the risk abates. In some embodiments, one or more of the propulsion devices 500/500A are activated 670 in a pulsed manner or in sequence as needed to prevent the collision or reduce harm.

Note that a similar program flow is used to detect objects that are moving towards the index vehicle 5X, which in some cases is stationary. In such, there is no activation of automatic braking 650 as the index vehicle 5X is already stationary.

Figure 22:
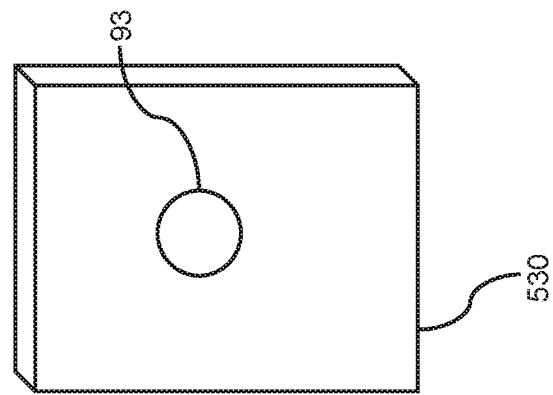
FIGS. 21 and 22 illustrate an optional self-contained module of the safety deceleration system.
Figure 21:
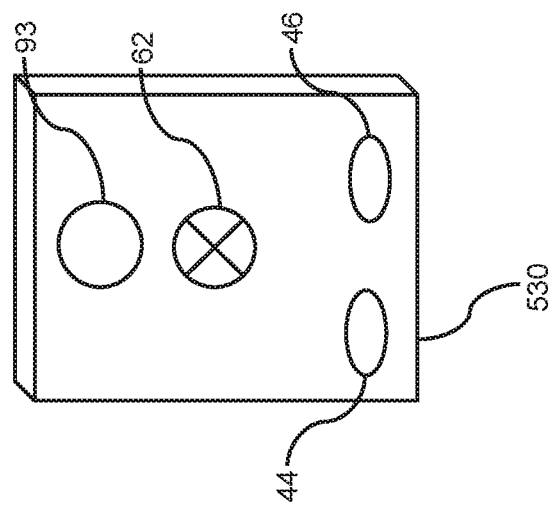

Referring to FIGS. 21 and 22, a self-contained module 530 is shown. As discussed previously, in some embodiments, circuitry (e.g. processor 70, sensors, projection devices, camera(s) 93, GPS 91) for predicting when the index vehicle 5X is on target for a collision with an object 502 are contained in a self-contained module 530 that, in some embodiments, is attached to the windshield or other surface of the index vehicle 5X, either internal to the index vehicle 5X or external to the index vehicle 5X. In FIG. 21, the outward facing side of the self-contained module 530 is shown. In this example, the external surface of the outward facing side of the self-contained module 530 includes a radar system 44, a sonar system 46, a holographic projecting device 62 and a front-facing camera 93. In such, the front-facing camera 93 captures images/video before, during, and after an occurrence of a collision.

In FIG. 22, the inward facing side of the self-contained module 530 is shown. In this example, the external surface of the inward facing side of the self-contained module 530 includes a rear-facing camera 93. In such, the rear-facing camera 93 captures images/video before, during, and after an occurrence of a collision.

In such embodiments, the self-contained module 530 includes circuitry for predicting when the index vehicle 5X is approaching and/or on target for a collision with an object 502 (e.g. a fixed object, other vehicle, pedestrian). The self-contained module 530 communicates with the one or more propulsion devices 500/500A to selectively initiate emission of jets of liquid 504 when the index vehicle 5X is on target for a collision with an object 502, thereby decelerating the target vehicle 5X to prevent a collision and/or reduce damages and bodily harm caused by the collision.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:
1. A vehicle safety system comprising:
    one or more sensors interfaced to an index vehicle;

a computer, the computer interfaced to the one or more sensors, the computer obtaining sensor data from the one or more sensors;

one or more propulsion devices interfaced to the index vehicle, each propulsion device operatively coupled to the computer such that the computer controls activation of each propulsion device;

the computer operatively configured to execute software that causes the computer to iteratively calculate a size of a safety zone based upon the sensor data and to iteratively determine if an object enters the safety zone as well as if a collision with the object is imminent; and if it is determined that the collision with the object is imminent, the software causes the computer to signal one or more of the propulsion devices to emit a jet of liquid, thereby decelerating and/or changing direction of the index vehicle and/or of the object;

wherein each of the one or more propulsion devices comprises an incendiary device, a reservoir of liquid coupled to the incendiary device, and an orifice through which the liquid flows as the jet of liquid upon ignition of the incendiary device by the computer.

2. The vehicle safety system of claim 1, wherein the liquid is water.

3. The vehicle safety system of claim 1, wherein the sensor data includes at least one sensor data item selected from the group consisting of a difference in velocity between a velocity of the index vehicle and a velocity of the object, a type of surface on which the index vehicle is traveling, a weather condition at the index vehicle, a road surface condition of a road on which the index vehicle is located, and an ambient light at the index vehicle.

4. The vehicle safety system of claim 3, wherein the weather condition includes an indication of at least one weather item selected from the group consisting of rain, ice, sleet, fog, and snow.

5. The vehicle safety system of claim 2, wherein the orifice is capped with a temporary plug that, upon ignition of the incendiary device, the temporary plug exits the orifice.

6. The vehicle safety system of claim 1, wherein the one or more sensors and the computer are housed in a standalone module.

7. A vehicle safety system comprising:
one or more sensors interfaced to an index vehicle;
a processor, the processor interfaced to the one or more sensors, the processor obtaining sensor data from the one or more sensors;
one or more propulsion devices interfaced to the index vehicle, each propulsion device operatively coupled to the processor such that the processor controls activation of each propulsion device;

software running on the processor, the software causes the processor to iteratively calculate a delta velocity between the index vehicle and an object in a travel path of the index vehicle and a distance between the index vehicle and the object; the software uses the delta velocity and distance to calculate if a collision between the index vehicle and the object is imminent; and if it is determined that the collision between the index vehicle and the object is imminent, the software causes the processor to signal one or more of the propulsion devices to emit a jet of liquid, thereby decelerating and/or changing direction of the index vehicle and/or of the object;

wherein each of the one or more propulsion devices comprises an incendiary device, a reservoir of liquid coupled to the incendiary device, and an orifice through which the liquid flows as the jet of liquid upon ignition of the incendiary device by the computer.

8. The vehicle safety system of claim 7, wherein the liquid is water.

9. The vehicle safety system of claim 7, wherein the sensor data includes at least one sensor data item selected from the group consisting of: two velocity sensors for sensing a velocity of the index vehicle and a velocity of the object, a type sensor that senses a type of surface on which the index vehicle is traveling, a weather condition sensor that senses a weather condition at the index vehicle, and a road surface condition sensor that senses a condition of a road on which the index vehicle is located.

10. The vehicle safety system of claim 9, wherein the software uses the delta velocity, the distance, and one or more of the type of surface, the weather condition, and the road surface condition; to calculate if the collision between the index vehicle and the object is imminent.

11. The vehicle safety system of claim 7, wherein the one or more sensors and the processor are housed in a standalone module.

12. The vehicle safety system of claim 7, wherein the orifice is capped with a temporary plug that, upon ignition of the incendiary device, exits the orifice.

13. The vehicle safety system of claim 7, wherein the index vehicle is a drone and a mass of the liquid is sufficient to instantaneously change a spatial position of an index drone in order to avoid impact with an incoming missile.

14. The vehicle safety system of claim 7, wherein the index vehicle is a drone and simultaneous ejection of liquid from two of the orifices that are 180 degrees from each other, thereby the spatial position of the drone is maintained while, at the same time, an incoming drone or an incoming missile is deflected.

* * * * *